US008480247B2

(12) United States Patent
Fleet et al.

(10) Patent No.: US 8,480,247 B2
(45) Date of Patent: Jul. 9, 2013

(54) INTERCHANGEABLE DECORATION SYSTEM

(76) Inventors: Philip B. Fleet, Reston, VA (US); Mark MacLean-Blevins, Westminster, MD (US); Matthew Lawrence Chin, New York, NY (US)

( * ) Notice: Subject to any disclaimer, the term of this patent is extended or adjusted under 35 U.S.C. 154(b) by 0 days.

(21) Appl. No.: 13/137,761

(22) Filed: Sep. 12, 2011

(65) Prior Publication Data

US 2012/0275171 A1 Nov. 1, 2012

Related U.S. Application Data

(60) Provisional application No. 61/479,564, filed on Apr. 27, 2011.

(51) Int. Cl.
*H04M 1/22* (2006.01)

(52) U.S. Cl.
USPC .............................................. 362/86; 362/253

(58) Field of Classification Search
USPC .......... 362/86, 253, 97, 124, 122, 85; 40/429, 40/430, 421, 423, 463, 470, 473, 474
See application file for complete search history.

(56) References Cited

U.S. PATENT DOCUMENTS

| | | | |
|---|---|---|---|
| 2,791,853 | A | 5/1957 | Coons |
| 2,847,780 | A | 8/1958 | Ellerman |
| 3,220,176 | A | 11/1965 | Morgan |
| 3,722,121 | A | 3/1973 | Olczewski |
| 3,802,104 | A | 4/1974 | Wiley |
| 4,006,586 | A | 2/1977 | Casella |
| 4,123,862 | A | 11/1978 | Dyer et al. |
| 4,189,857 | A | 2/1980 | Fujisawa |
| 4,208,870 | A | 6/1980 | Cullom |
| 4,253,178 | A | 2/1981 | Kolaczia |
| 4,450,636 | A | 5/1984 | Lasurdo |
| 4,466,745 | A | 8/1984 | Eichmann |
| 4,473,304 | A | 9/1984 | Ketner |
| 4,525,077 | A | 6/1985 | Ketner |
| 4,624,579 | A | 11/1986 | Forman |
| 4,934,077 | A | 6/1990 | Gerlach |
| 4,939,913 | A | 7/1990 | Scungio |
| 4,941,137 | A | 7/1990 | Kikuchi |
| 4,993,006 | A | 2/1991 | Oshima |
| 5,008,869 | A | 4/1991 | Dweck |
| 5,051,969 | A | 9/1991 | Huang |
| 5,077,709 | A | 12/1991 | Feher |
| 5,142,512 | A | 8/1992 | Takano |
| 5,174,054 | A | 12/1992 | Politi |
| 5,224,078 | A | 6/1993 | Mallin |
| 5,283,769 | A | 2/1994 | Renton |
| 5,319,615 | A | 6/1994 | Ng |
| 5,335,433 | A | 8/1994 | Borden |
| 5,375,102 | A | 12/1994 | Schiavolini |
| 5,380,206 | A | 1/1995 | Asprey |
| 5,396,474 | A | 3/1995 | Lin |
| 5,460,087 | A | 10/1995 | Ogorzalek |
| 5,581,922 | A | 12/1996 | Heimann |
| 5,654,940 | A | 8/1997 | Wei |
| 5,678,792 | A | 10/1997 | Arguin |
| 5,706,594 | A | 1/1998 | Lin |
| 5,713,147 | A | 2/1998 | Johnson |
| 5,751,667 | A | 5/1998 | Nunes |

(Continued)

*Primary Examiner* — Anne Hines
(74) *Attorney, Agent, or Firm* — Brian D. Laubscher

(57) ABSTRACT

A decoration system having a base object, receiving rings, decorative objects, and means for releasably coupling the decorative objects to the receiving rings. One or more of the receiving rings may rotate relative to the base object for a specified duration of time.

21 Claims, 33 Drawing Sheets

U.S. PATENT DOCUMENTS

| | | | |
|---|---|---|---|
| 5,787,055 | A | 7/1998 | Alpert |
| 5,793,710 | A | 8/1998 | Jacobi |
| 6,010,338 | A | 1/2000 | Watson |
| 6,118,735 | A | 9/2000 | Li |
| 6,209,246 | B1 | 4/2001 | Schwartz |
| 6,278,664 | B1 | 8/2001 | Huffman |
| 6,338,215 | B1 | 1/2002 | Vincent |
| 6,347,472 | B1 | 2/2002 | Dominguez |
| 6,382,625 | B1 | 5/2002 | Chang |
| 6,412,744 | B1 | 7/2002 | Wollam |
| 6,418,652 | B1 | 7/2002 | Crawford |
| 6,421,302 | B1 | 7/2002 | Wimberly |
| 6,836,450 | B2 | 12/2004 | Gilbert |
| 6,891,778 | B1 | 5/2005 | Hohenstein |
| 6,942,379 | B2 | 9/2005 | Hardy |
| 7,114,278 | B2 | 10/2006 | Marks |
| 7,155,933 | B2 | 1/2007 | Pourmehdi |
| 7,196,974 | B2 | 3/2007 | Yang |
| 7,267,480 | B1 | 9/2007 | Hasson |
| 7,339,856 | B1 | 3/2008 | Hardesty |
| 2002/0174578 | A1 | 11/2002 | Ross |
| 2003/0235118 | A1 | 12/2003 | Lai |
| 2006/0067169 | A1 | 3/2006 | Mo |
| 2006/0201039 | A1 | 9/2006 | Gilliland |
| 2007/0113454 | A1 | 5/2007 | Kerns |
| 2008/0193786 | A1 | 8/2008 | Morton |
| 2009/0126248 | A1 | 5/2009 | Burnstein |
| 2010/0154267 | A1 | 6/2010 | Nip |

SECTION A-A
SCALE 1 : 2

DETAIL G
SCALE 1 : 1

DETAIL H
SCALE 1 : 1

SECTION B-B
SCALE 1 : 2

INTERCHANGEABLE DECORATION SYSTEM

CROSS REFERENCE TO RELATED APPLICATIONS

Application claims priority to the Provisional Application Ser. No. 61/479,564 filed on Apr. 27, 2011.

BACKGROUND OF THE INVENTION

1. Field of the Invention

This invention relates generally to a decoration system for home furnishings and other solid objects.

2. Description of the Related Art

Many people enjoy decorating and customizing their rooms, furniture, and personal items. As a result, there are a large number of different arts and crafts kits that are designed to help people more easily accomplish this goal.

Such kits may include paint, markers, colored paper, fabric, felt, pictures, glitter, stickers, glue, ribbon, magnets, beads, sequins, or jewelry, as well as two- and three-dimensional representations of people, animals, and other objects.

Most kits only allow a user to decorate an object a single time. A user might paint, apply stickers or glitter to, or otherwise modify an object. However, once the user has finished, there are no or very limited means by which the user may remove or undo what the user has done.

Additionally, most decorations are stationary. Once applied, they neither move on their own nor may they be moved by a user.

Furthermore, these kits are generally designed with the intent that a user only make use of the provided items, and such items are usually all of the same theme. As a result, a user has limited options as to how they may decorate a desired object. Moreover, the base object of other decoration systems is typically one item serving one purpose, for example a clock or a message board.

Accordingly, there is a need for a decoration system with a base object or objects offering greater flexibility and utility, and which allows for repeated decoration; that has movable decorations; and that allows a user to employ their own decorations, as well as purchased decorations, thereby giving a user a virtually unlimited number of options as to the theme, style, and method of decorating and using an object.

BRIEF SUMMARY OF THE INVENTION

This invention is directed to a decoration system having a base object to be decorated, one or more receiving rings coupled to the base object, decorative objects, and means for coupling the decorative objects to the receiving rings. The decorative objects are coupled to the receiving rings by means that allow them to be removed and replaced. Furthermore, at least one of the receiving rings is designed to allow the decorative objects to rotate around the periphery of the base object. Also, in addition to purchasing the decorative objects, a user may design their own decorative objects for attachment to the receiving means.

BRIEF DESCRIPTION OF THE DRAWINGS

Other objects and advantages of the invention will become apparent from a study of the following specification when viewed in the light of the accompanying drawings, in which.

DETAILED DESCRIPTION OF THE INVENTION

Figure 1A:
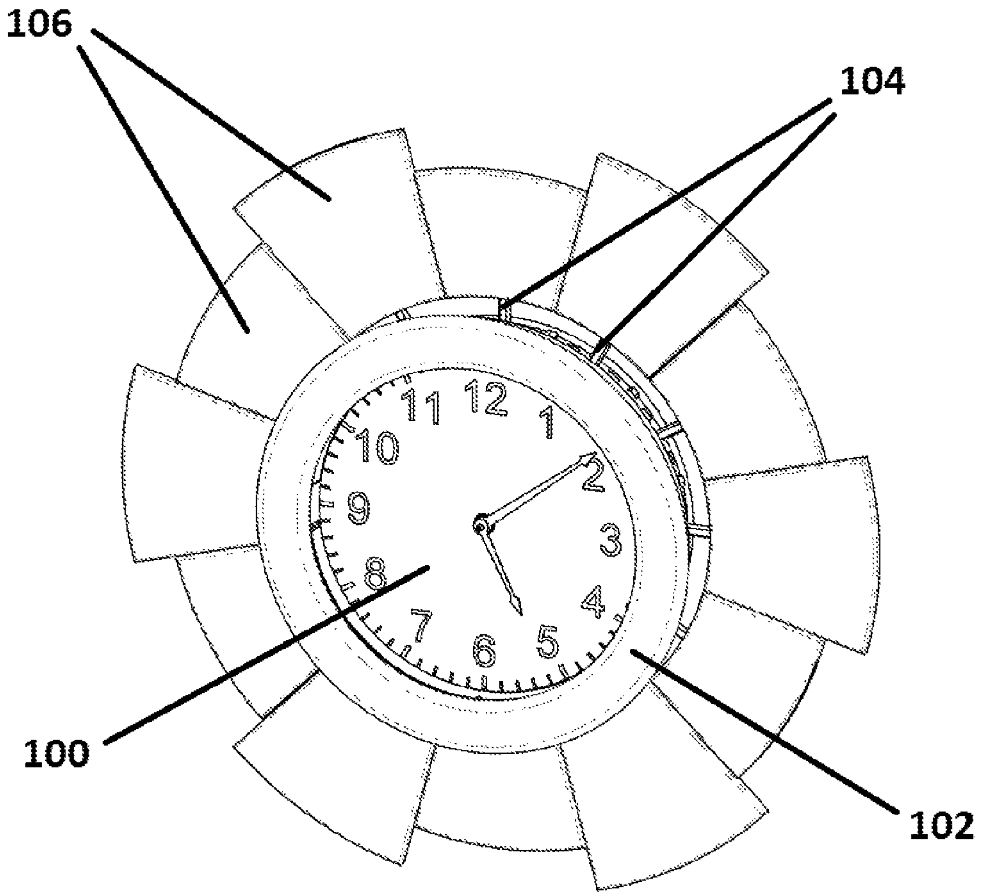
FIG. 1*a* is a perspective view of the decoration system of the present invention, showing one possible type of decorative object as applied to a wall clock.

Several embodiments of the decoration system are shown in FIGS. 1-8. The decoration system comprises a base object 100 with rim 102, a first receiving ring 300, a second receiving ring 304, receiving holes 302, spokes 104, snaps 800, adhesive layer 806, and decorative objects 106. Additionally, as shown in FIG. 1*e*, the decoration system includes horizontal couplers 2000 for tabletop orientation.

The base object 100 shown in FIGS. 1*a*, 1*b*, 2, 3, 4, 5, 6*a*, 6*b*, and 7 is a standard wall clock. However, other base objects 100 may be used. For example, the base object 100 may be almost any furnishing or solid object including, but not limited to, clocks, mirrors, message boards, and picture frames. Furthermore, the base object 100 may include several functional display elements. The functional display elements may be two sided, and for example, have a mirror on one side and a message board on the other side. This allows the functional display element to be reversible from one side to the other side. Moreover, as later described, the same external structure might house several base object variations. For example, a clock face and mechanics might be resident beneath a removable, reversible mirror/message board, such that one external structure encompasses several, in this example three, base object options or functional display elements from which the user can choose.

The base object 100 includes a rim 102 that may be customized. In particular, the rim 102 is not only decoratable but also removable, which allows a user to select and attach any desired rim 102 that coordinates with or complements a desired theme.

Figure 3:
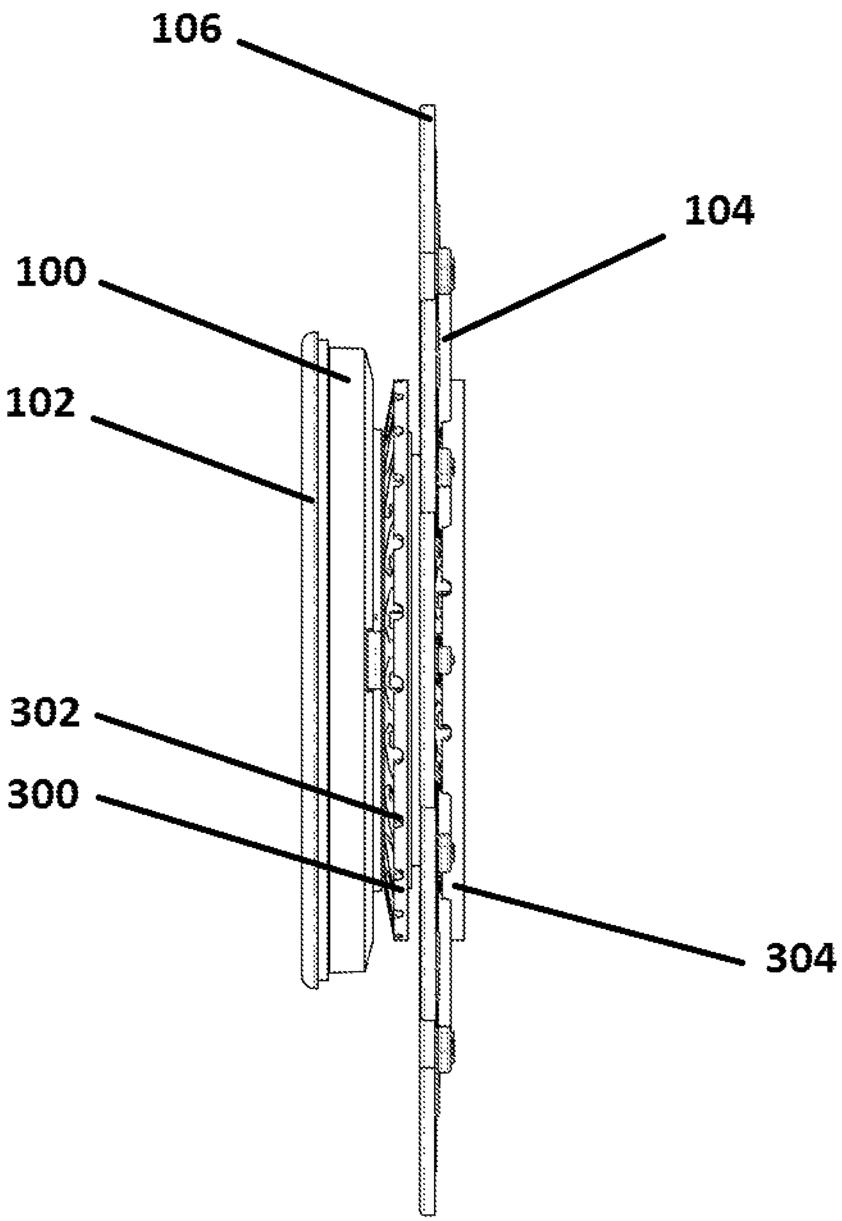
FIG. 3 is a side view of the decorated wall clock.

A first receiving ring 300 is coupled to the rear of the base object 100 (shown most clearly in FIG. 3). The first receiving ring 300 has receiving holes 302 around its periphery that are shaped to receive spokes 104. The first receiving ring 300 may be stationary or it may be designed to rotate, thus allowing the spokes 104 to move around the periphery of the base object 100. A user may manually rotate the first receiving ring 300, such as by grasping it and pulling or pushing, or the first receiving ring 300 may rotate automatically. Automatic rotation may be accomplished by any conventional means known in the art, such as a motor. Furthermore, the automatic rotation may be constant, meaning that once activated it continues until deactivated, or it may be for a fixed duration. For example, upon the press of a button or the flip of a switch, the first receiving ring 300 may rotate for ten minutes or some other appropriate time period, such as while a child falls asleep, before automatically stopping. The switch may control the speed, direction, duration, and other characteristics of the rotation.

Figure 6A:
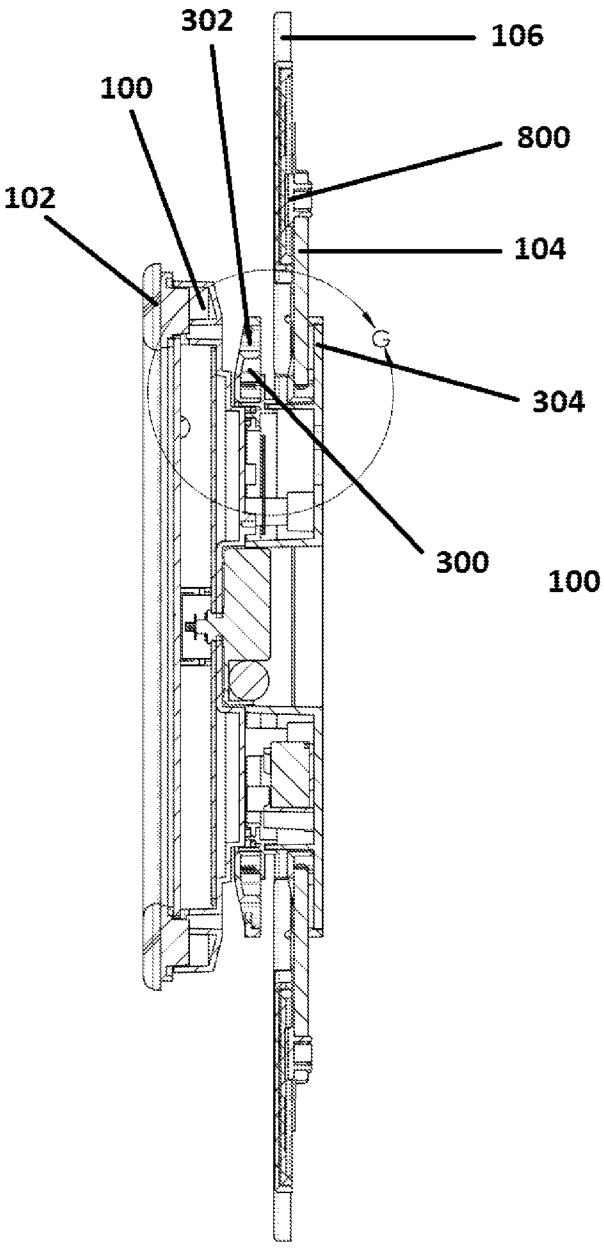
FIG. 6A is a section view, taken along Line A-A of FIG. 2.
Figure 6B:
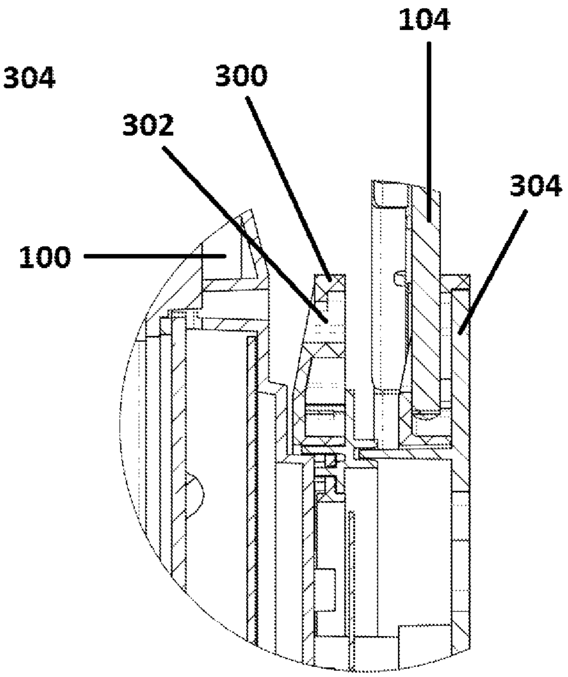
FIG. 6B is a detail view, as taken from FIG. 6A.
Figure 7:
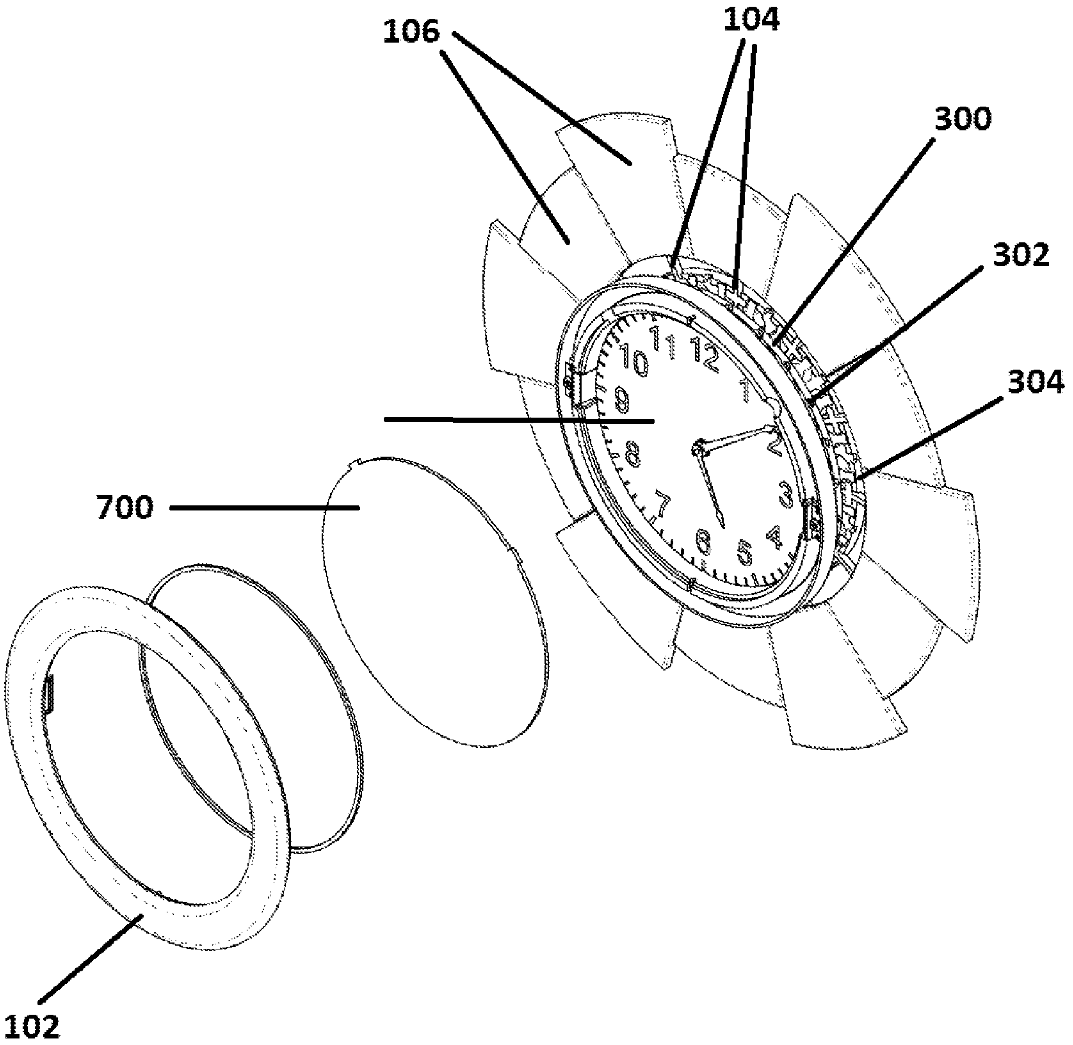
FIG. 7 is a partially exploded perspective view of the decorated wall clock.

A second receiving ring 304 may be coupled to the first receiving ring 300 or to the base object 100 (shown most clearly in FIGS. 6A-6B). The second receiving ring 304 may be designed and operated in a manner identical to the first receiving ring 300. However, the second receiving ring 304 need not operate exactly the same as the first receiving ring 300. In other words, while both elements may be stationary or may both rotate, it is also possible that one may be stationary while the other is rotatable. More specifically, various embodiments include where the first receiving ring 300 and the second receiving ring 304 are both rotatable; the first receiving ring 300 and the second receiving ring 304 are both stationary; the first receiving ring 300 is rotatable while the second receiving ring 304 is stationary; and the first receiving ring 300 is stationary while the second receiving ring 304 is rotatable.

Although this embodiment includes a first receiving ring 300 and a second receiving ring 304, only a first receiving ring 300 is necessary. Additionally, more than two receiving rings may be employed. The purpose of the second receiving ring 304, and any additional receiving rings, is to provide further layers of decorative objects 106, thereby enhancing the overall visual appeal of the base object 100 and decoration system.

Figure 8:
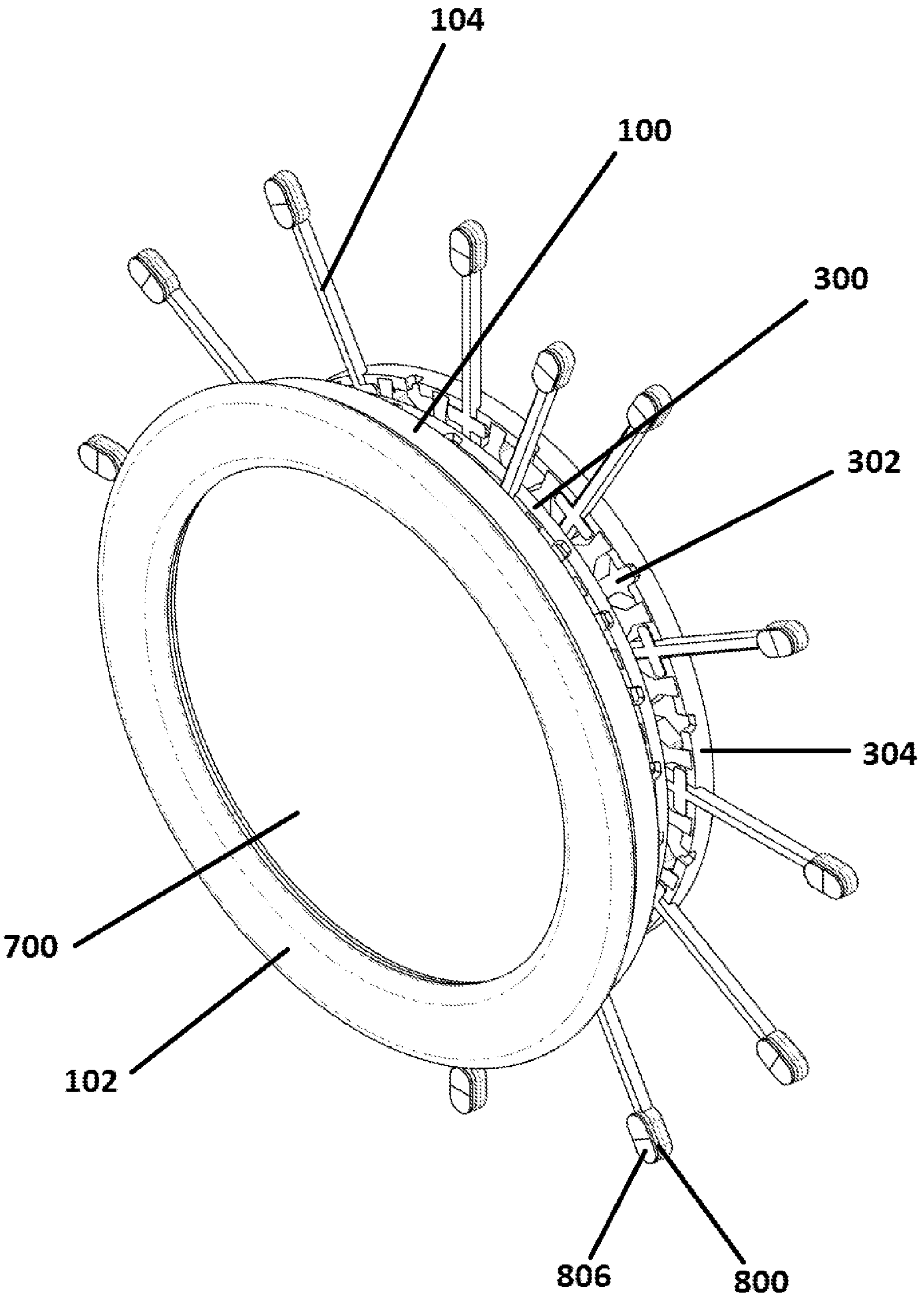
FIG. 8 is perspective view of the decoration system of the present invention without decorative objects coupled to the spokes.
Figure 9:
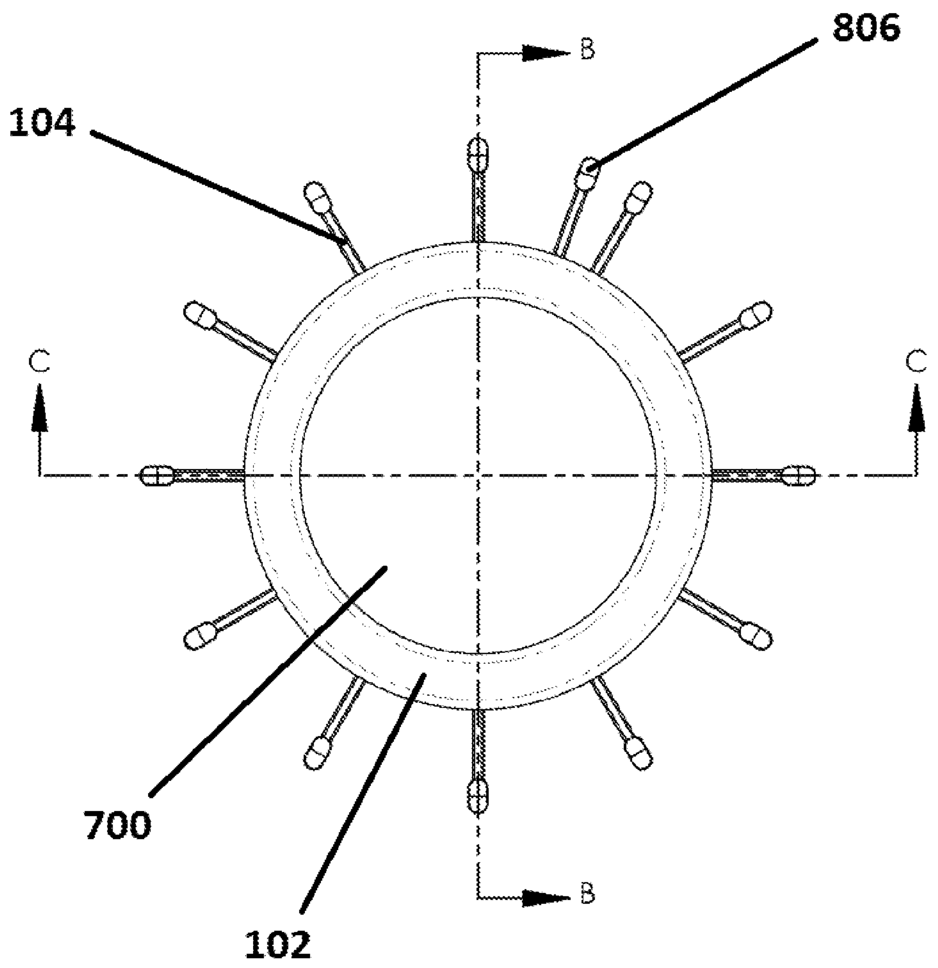
FIG. 9 is a front view without decorative objects.
Figure 10B:
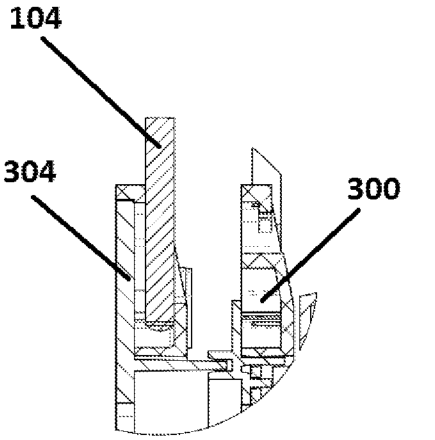
FIG. 10B is a detail view, as taken from FIG. 10A.
Figure 10A:
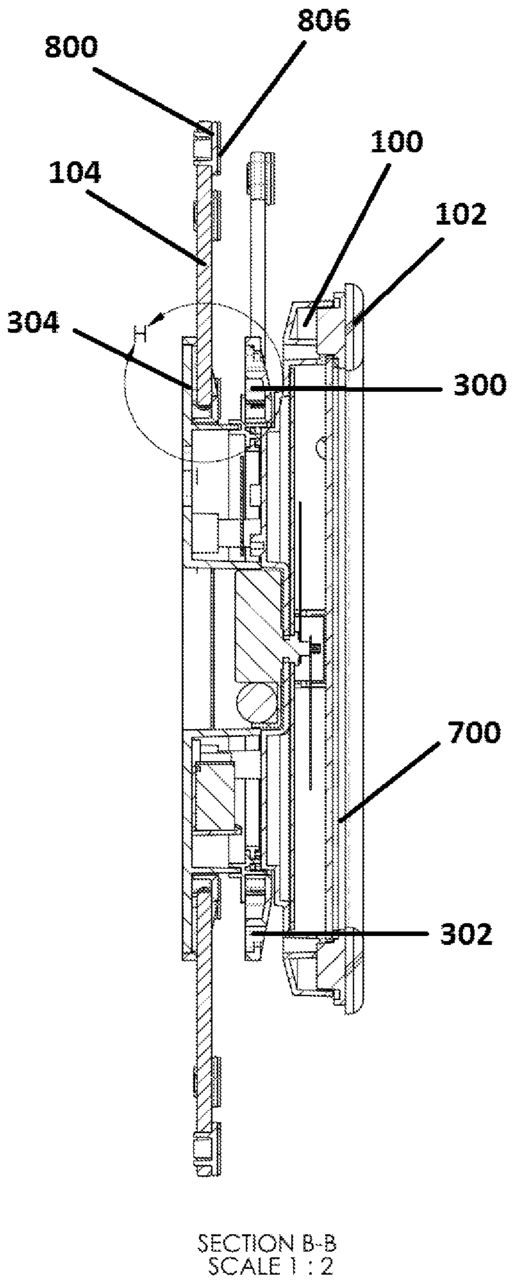
FIG. 10A is a section view, taken along Line B-B of FIG. 9.
Figure 11:
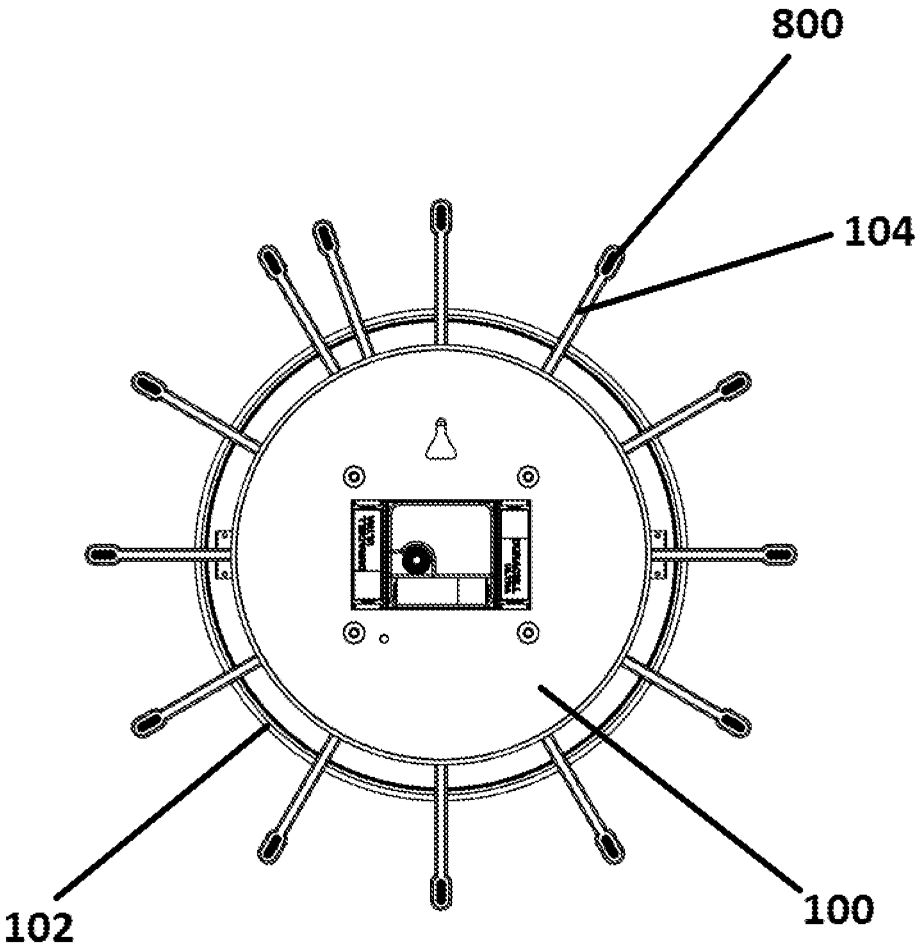
FIG. 11 is a rear view without decorative objects.
Figure 12B:
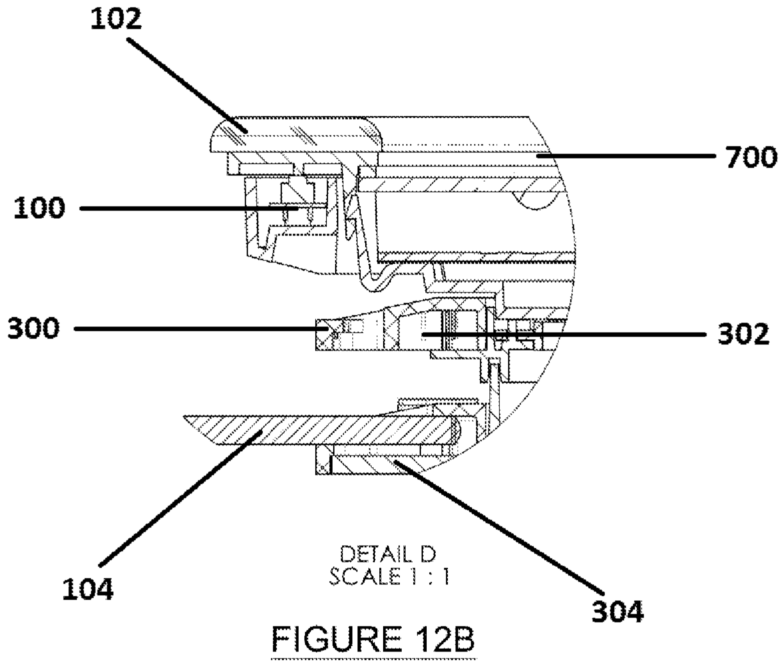
FIG. 12B is a detail view, as take from FIG. 12A.
Figure 12A:
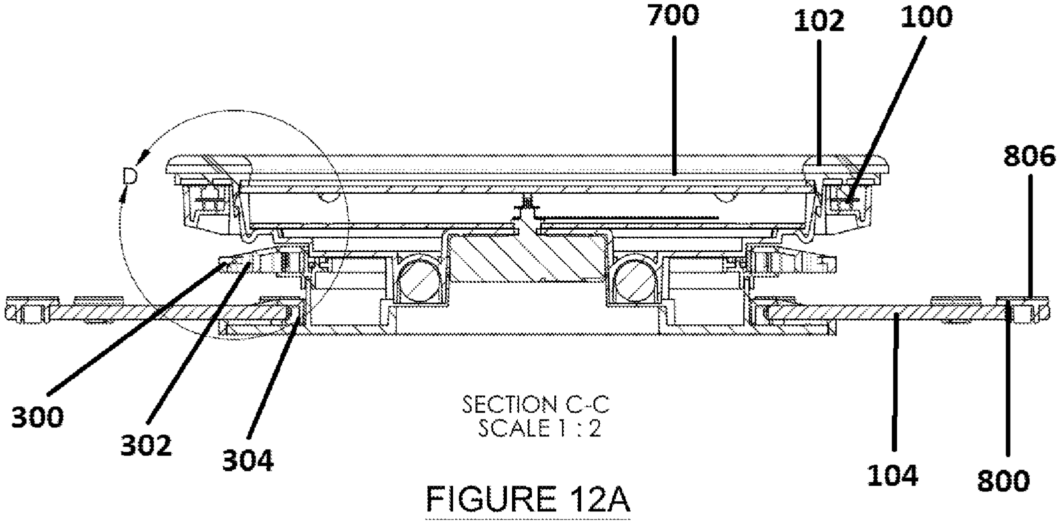
FIG. 12A is a section view, taken along Line C-C of FIG. 9.
Figure 13:
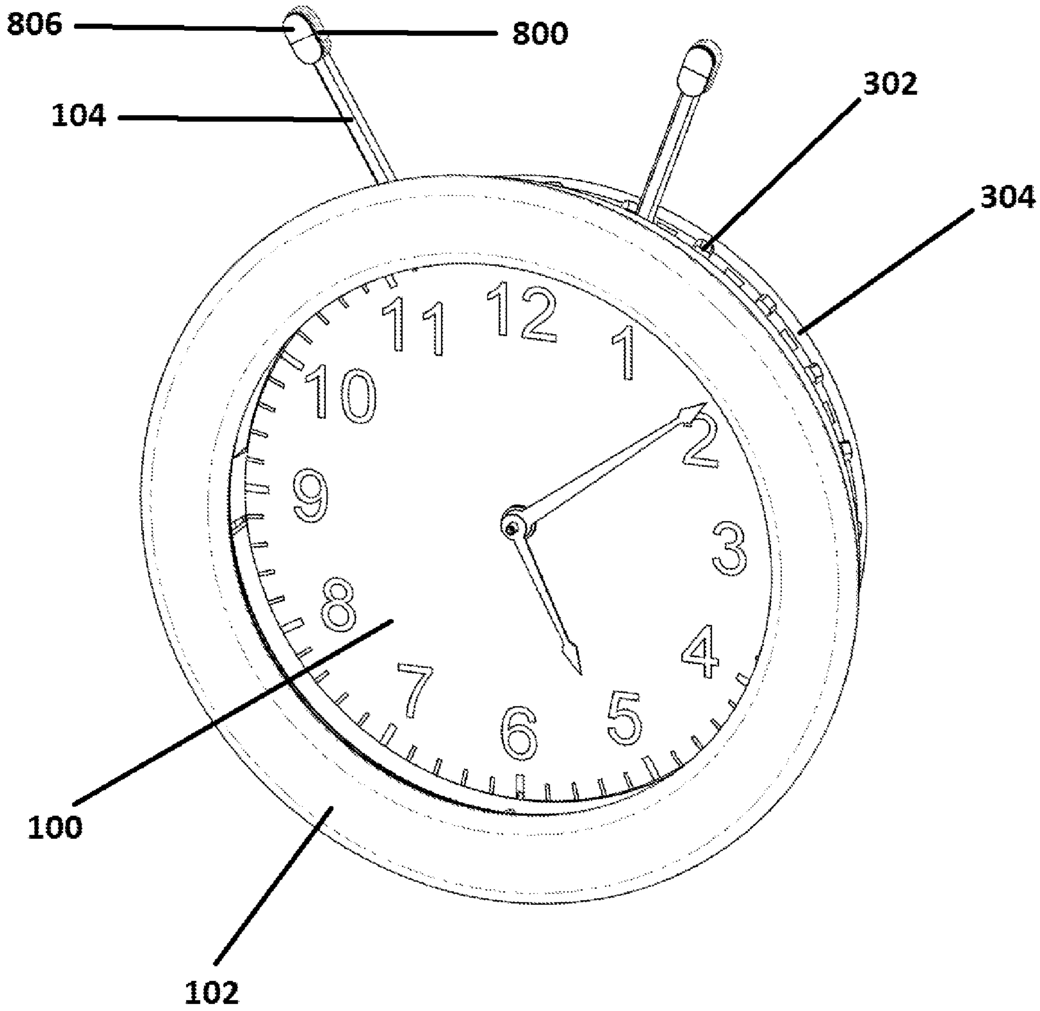
FIG. 13 is an additional perspective view of the decoration system of the present invention without decorative objects.
Figure 14:
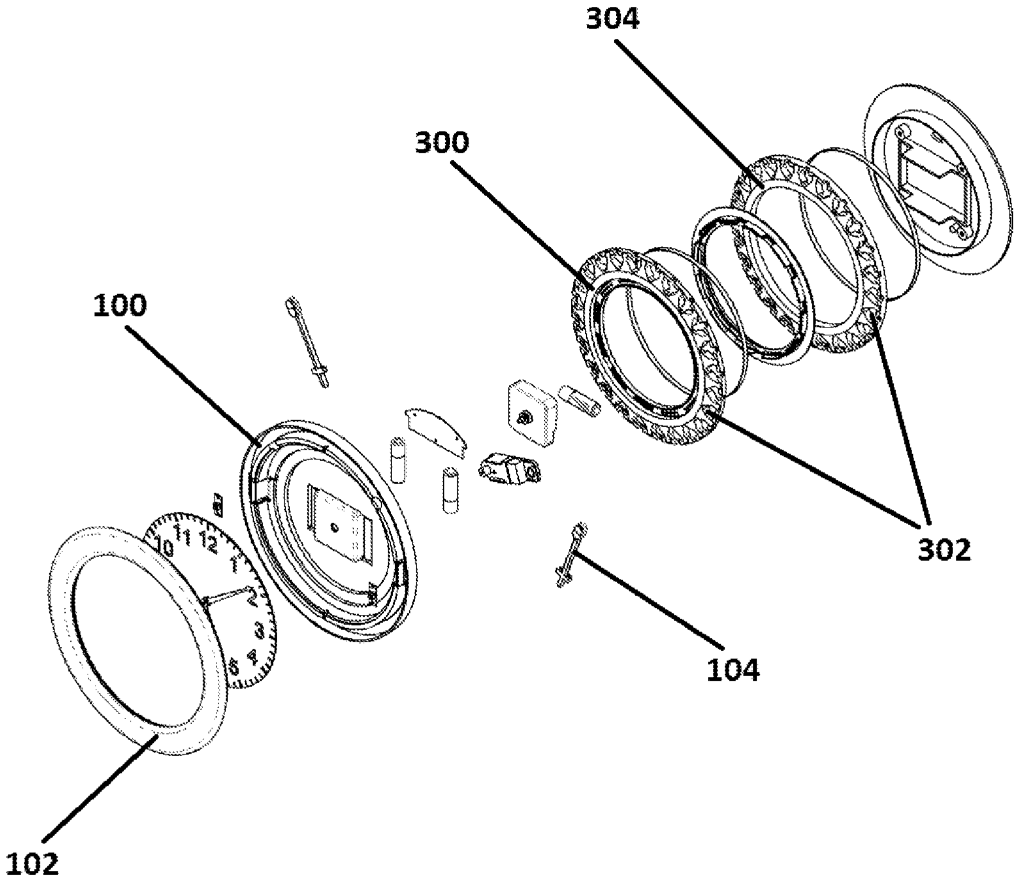
FIG. 14 is an isometric exploded view of the decoration system of the present invention without decorative objects.
Figure 15:
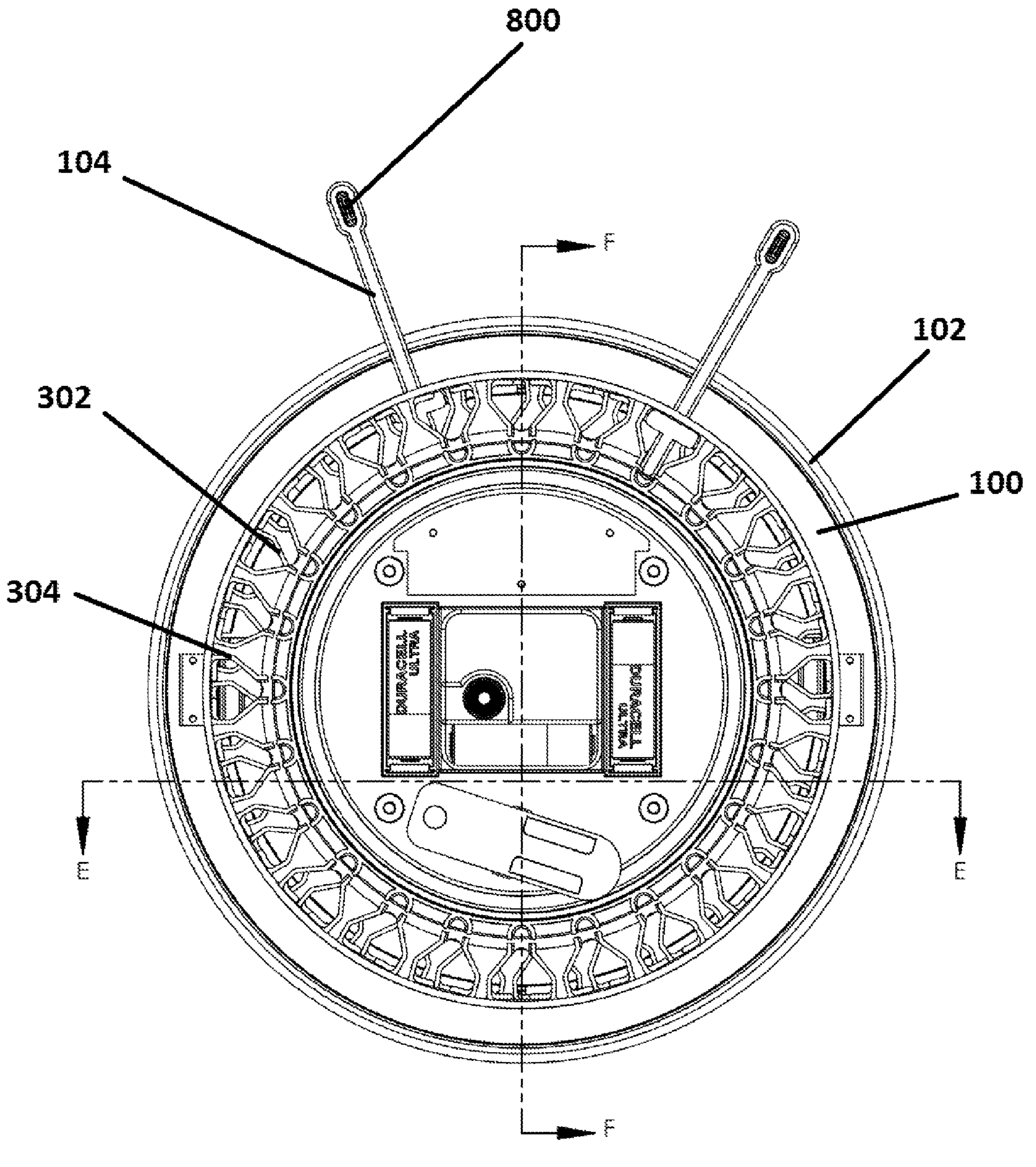
FIG. 15 is an additional rear view of the decoration system of the present invention without decorative objects.
Figure 16:
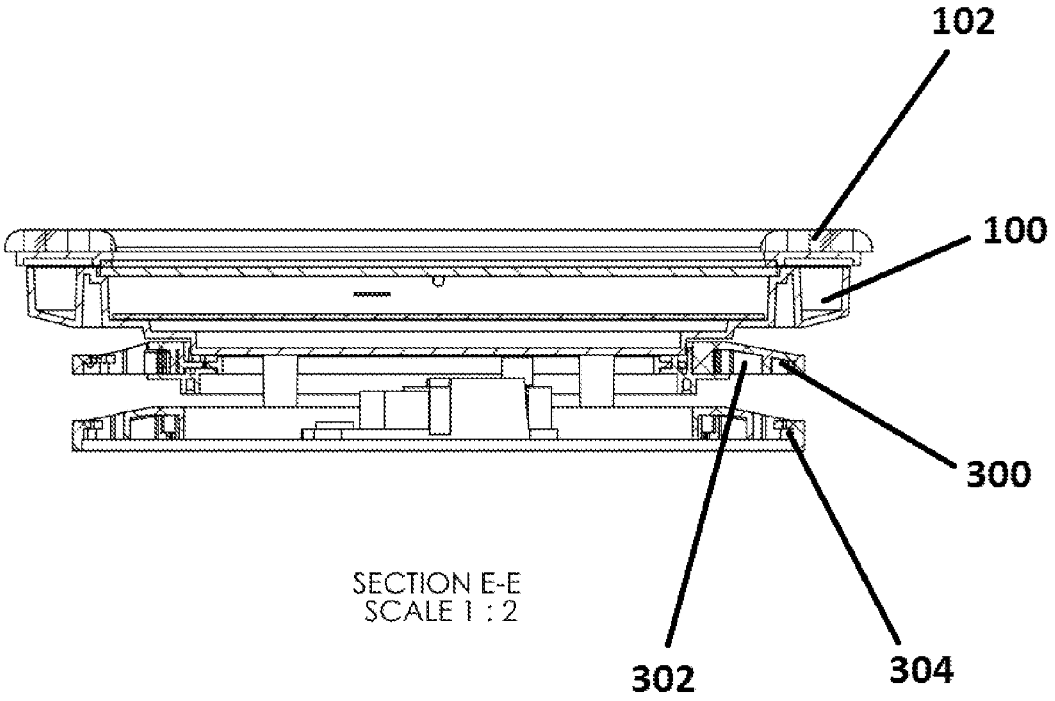
FIG. 16 is a section view, taken along Line E-E of FIG. 15.
Figure 17:
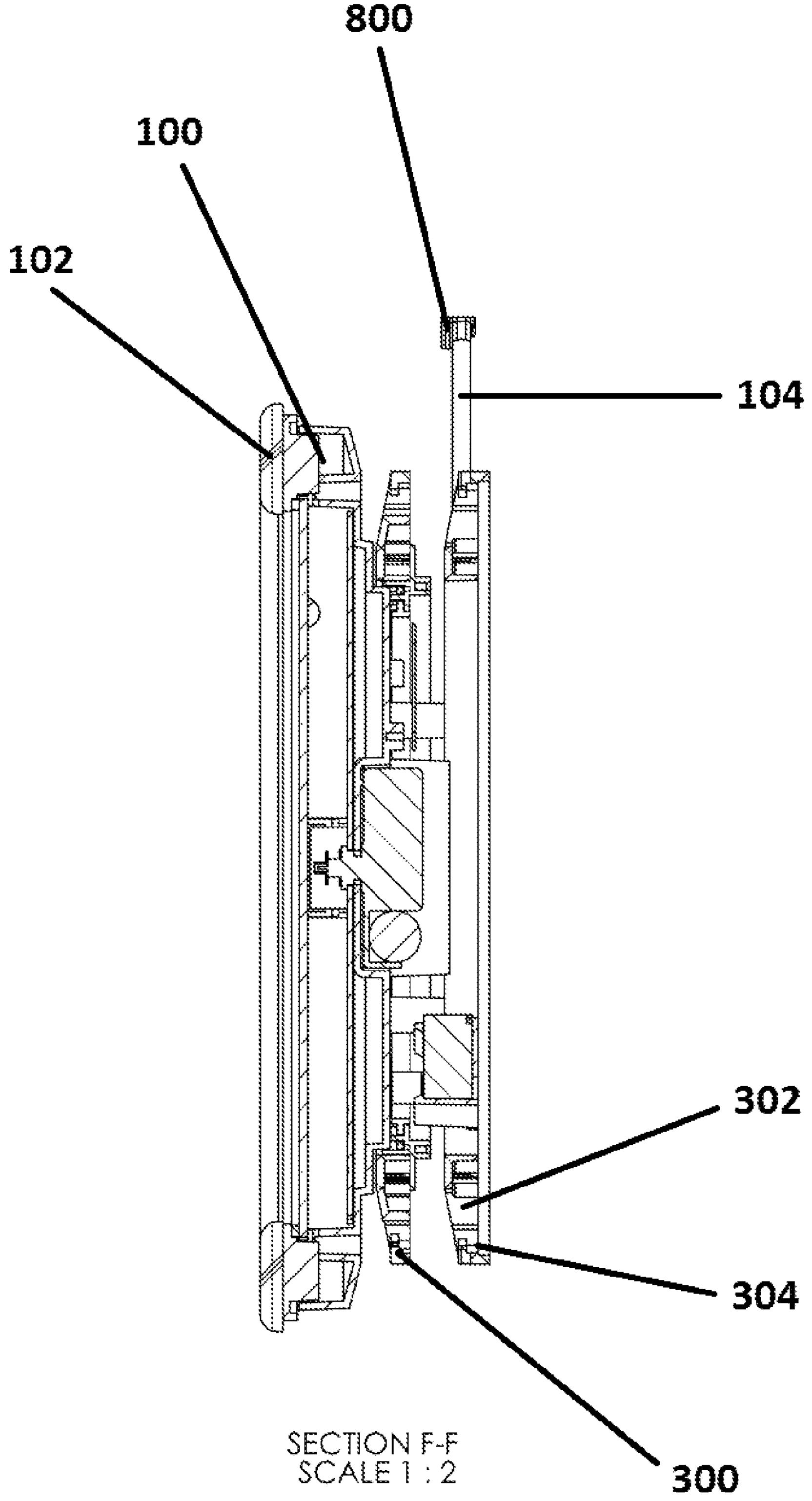
FIG. 17 is a section view, taken along Line F-F of FIG. 15.

Spokes 104 may be placed in the receiving holes 302 located around the periphery of the first receiving ring 300 and the second receiving ring 304 (shown most clearly in FIG. 8). The spokes 104 may be placed in every receiving hole 302 or any subset of the receiving holes 302. Any conventional means, known in the art, may be used to couple the spokes 104 to the receiving holes 302.

In one embodiment, the spokes 104 may be coupled to the receiving holes 302 by the method shown in FIGS. 22A-25B. First, a user slides a spoke 104 into a receiving hole 302 at an angle (shown in FIGS. 22A-B). As the spoke 104 enters the receiving hole 302, it is pressed against a tension band 2200. Then, the spoke 104 is tilted back and away from the front face of the base object 100 so that it reaches the position shown in FIG. 24A. Once in that position, the user releases the spoke 104 and the tension band 2200 is allowed to push the spoke 104 toward the outer periphery of the first receiving ring 300, thereby locking the spoke 104 into the position shown in FIG. 25A. To remove the spoke 104, the user presses the spoke 104 toward the center of the first receiving ring 300 thereby to engage the tension band 2200, tilts the spoke 104 toward the front face of the base object 100, and then pulls the spoke 104 back out of the receiving hole 302.

Figure 2:
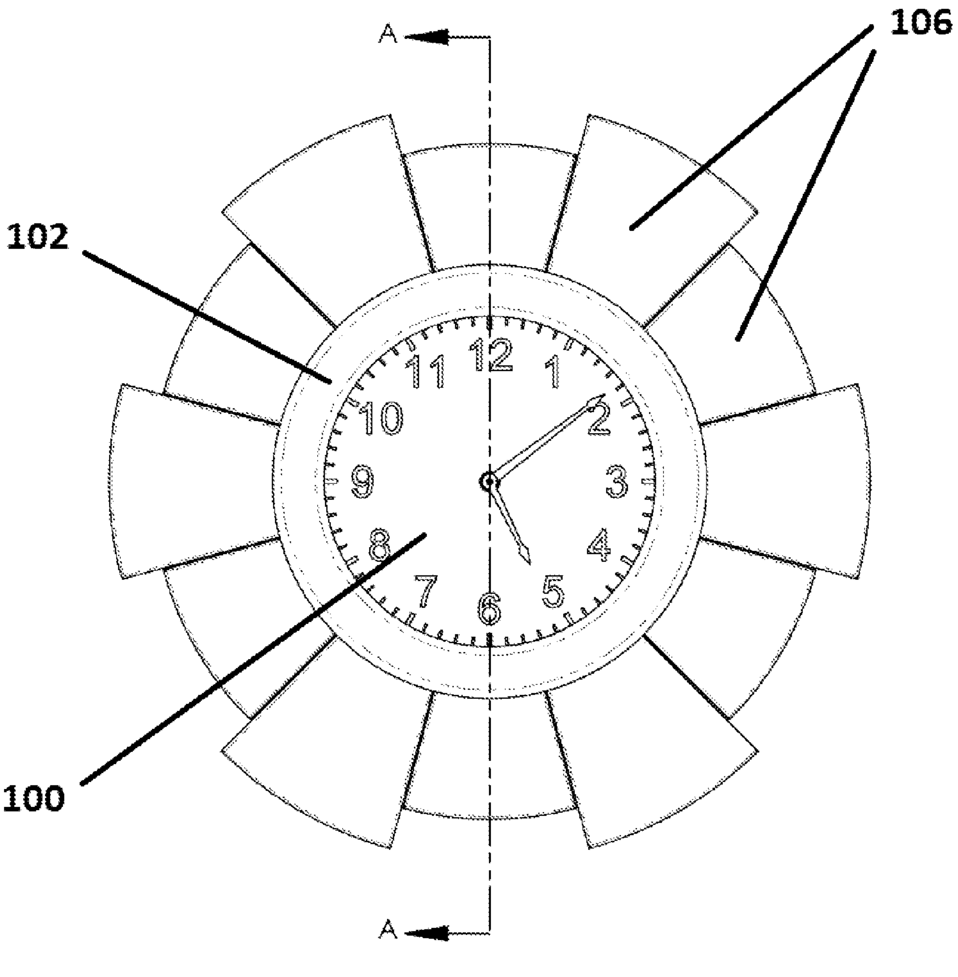
FIG. 2 is a front view of the decorated wall clock.
Figure 4:
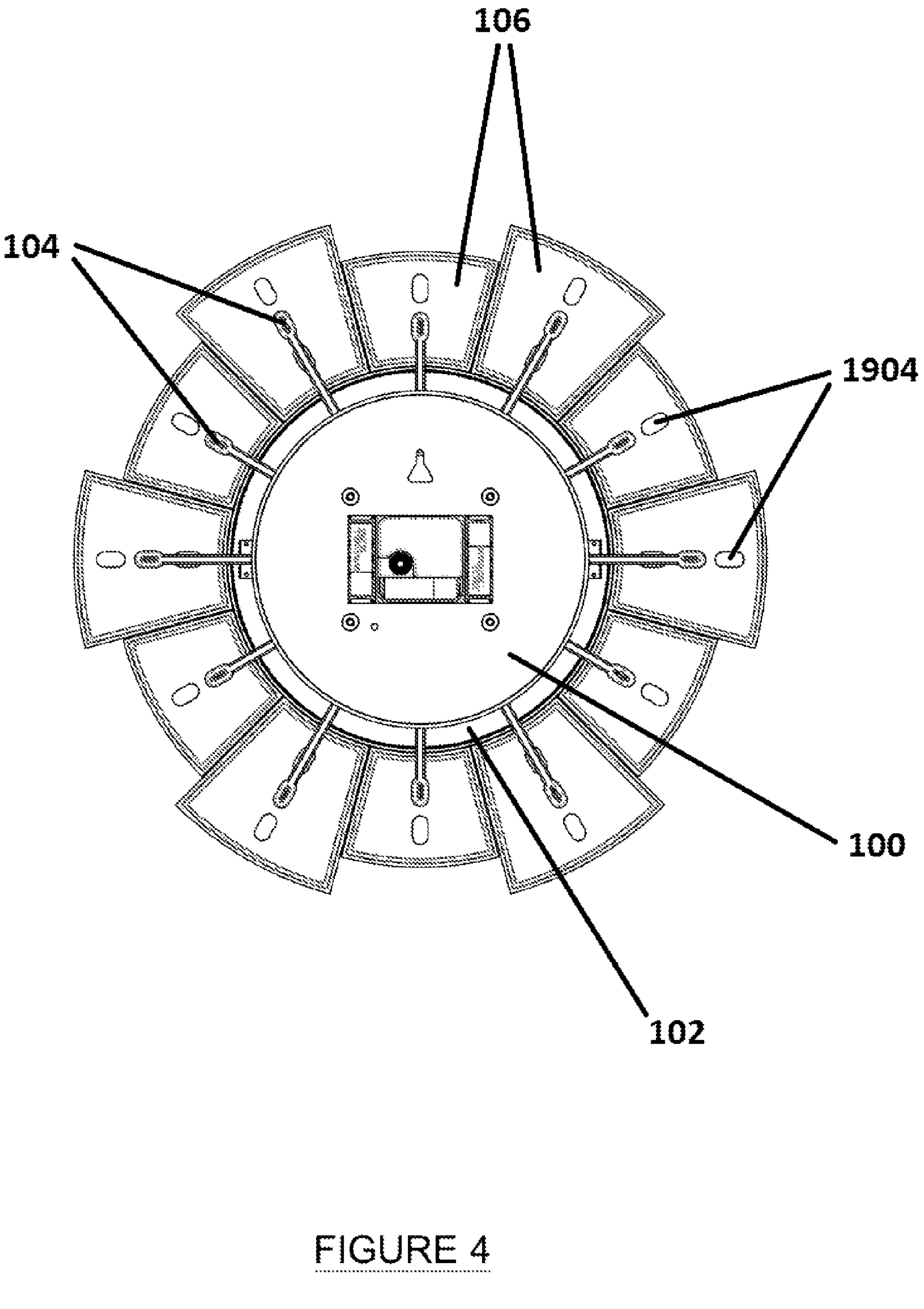
FIG. 4 is a rear view of the decorated wall clock.
Figure 5:
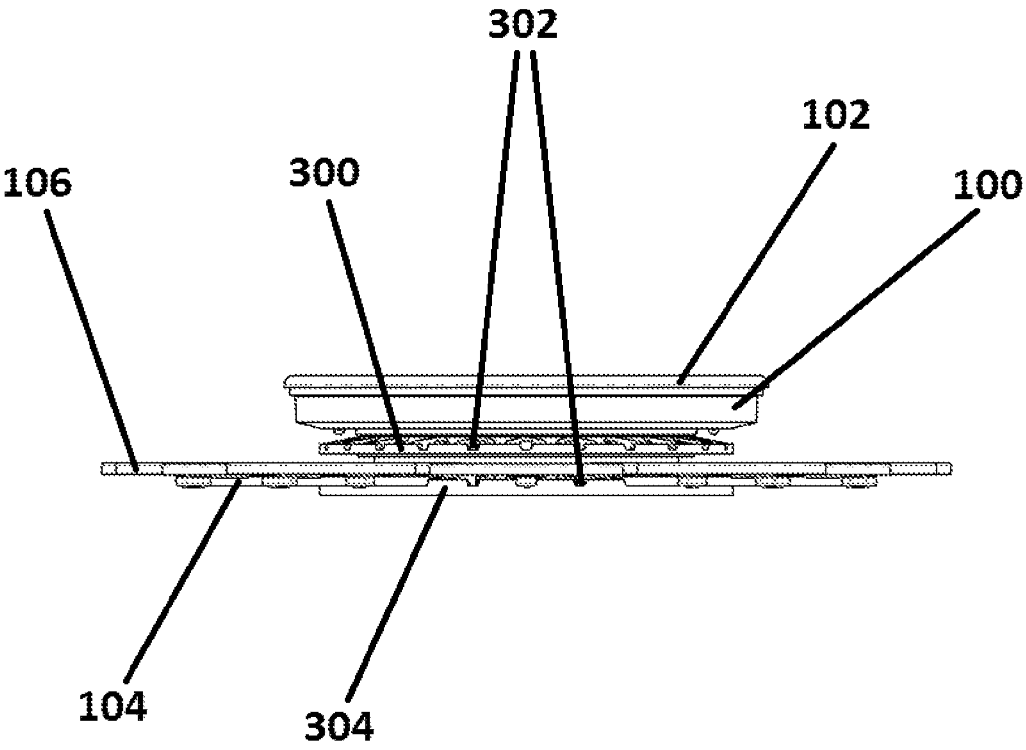
FIG. 5 is a side view of the decorated wall clock when positioned horizontally on a tabletop or other surface.

As can be seen most clearly in FIG. 4, the spokes 104 may come in several sizes or lengths in order to accommodate a variety of different decorative objects 106 and to allow the user greater flexibility in positioning of the decorative objects 106 in relation to the base object 100. For example, shorter spokes 104 may be used with decorative objects 106 that are intended to appear flush with the rim 102 of the base object 100 (as shown in FIG. 2), while longer spokes 104 could be used with decorative objects 106 that the user wishes to extend further out. Similarly, spokes 104 may be hidden behind the decorative objects 106, such as when the decorative objects 106 appear flush with the rim 102, or the spokes 104 may be visible, such as when the decorative objects 106 extend further out. In cases where the spokes 104 are visible, a user may decorate or customize the spokes 104, such as by painting them, so that they coordinate with the decorative objects 106 and overall theme. Finally, although the spokes 104 of this embodiment are generally shown as having straight edges, the spokes 104 may also be designed to have curves, angles, loops, adornments, and other non-straight configurations or embellishments.

Figure 18:
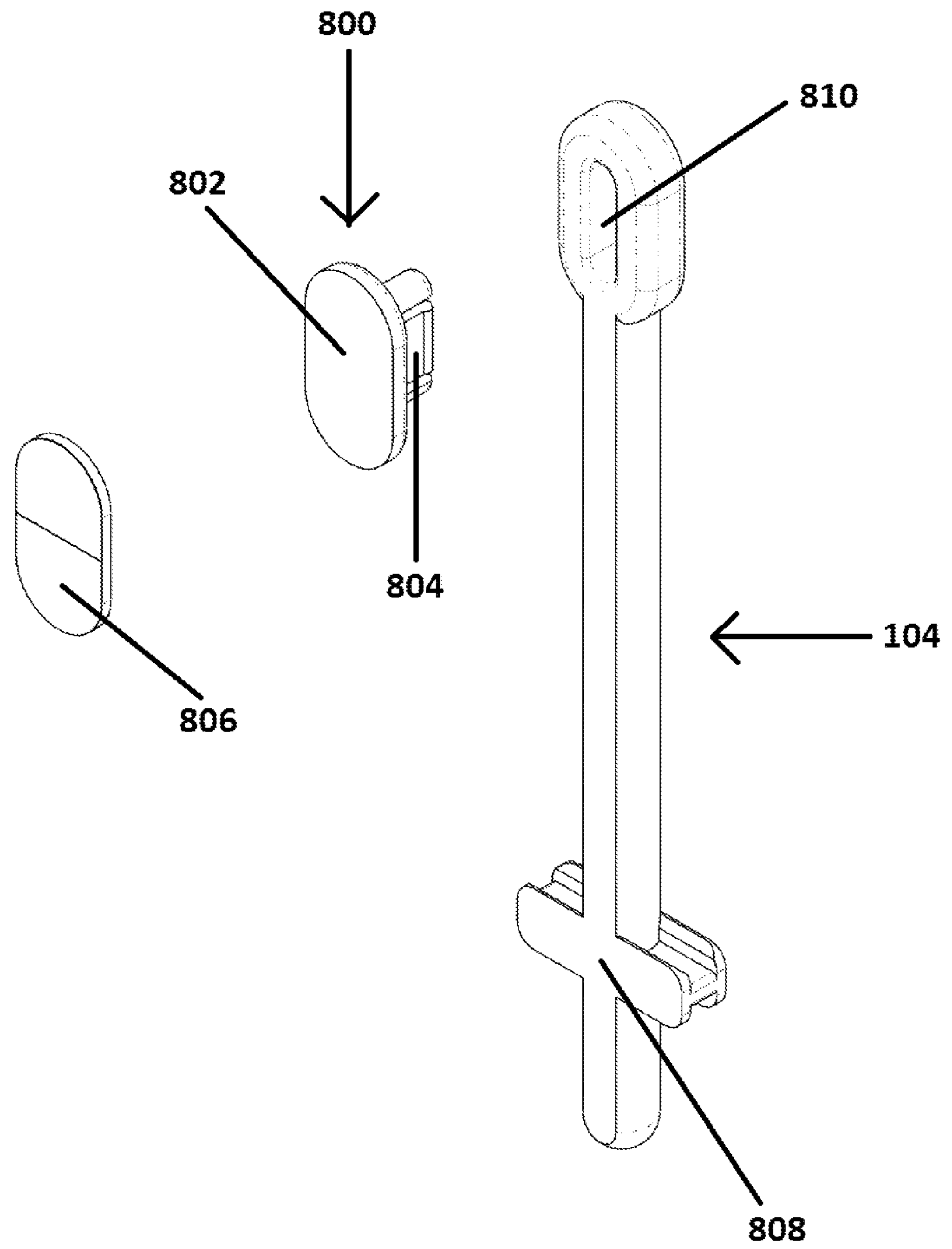
FIG. 18 is a perspective exploded view of spoke and snap elements of the decoration system of the present invention.

Snaps 800, which serve primarily to attach decorative objects 106 to spokes 104, may be coupled to the spokes 104, one possible method of which is most clearly illustrated with reference to FIG. 18. FIG. 18 shows a spoke 104 having a snap receiving hole 810 and a lower spoke portion 808; a snap 800 having a planar portion 802 and a spoke-mating portion 804; and an adhesive layer 806 for the snap 800.

In order to couple a snap 800 to the spoke 104, in the embodiment shown in FIG. 18, the spoke-mating portion 804 is pushed into the snap receiving hole 810. As the spoke-mating portion 804 is inserted, it is compressed in order to fit through the snap receiving hole 810. Once fully inserted, the spoke-mating portion 804 expands in order to securely lock the snap 800 in place. Should a user desire to remove a snap 800, the user need only pull on the snap 800 or its attached decorative object 106 with sufficient force to compress the spoke-mating portion 804 and pull it back through the snap receiving hole 810. While one particular embodiment has been described, any conventional means, known in the art, may be used to couple snaps 800 to spokes 104.

As noted previously, the primary purpose of the snaps 800 is to provide a convenient means to couple a decorative object 106 to a spoke 104. In order to accomplish this, an adhesive layer 806 is first coupled to the planar portion 802 of each snap 800. Then, when a user desires to couple a decorative object 106 to a snap 800, they simply remove the protective covering from the adhesive layer 806, thereby exposing an adhesive, and then place the decorative object 106 in contact with the adhesive layer 806. The adhesive layer 806 may be integral with the snap 800 or it may be a separate unit. The adhesive may be any conventional adhesive means known in the art, such as glue or double-sided tape.

In addition to the primary adhesive function of the snaps 800, they also provide a useful alignment function. As most clearly shown in FIGS. 19A and 19B, an image or indentation can be printed, etched or otherwise incorporated into the decorative object 106 to guide the user as to where to place their snap 800 should they wish to display their decorative object 106 around the base object 100 in a consistent and predictable manner in relation to the base object 100 and in relation to other decorative objects 106.

While snaps 800 have been included in this embodiment in order to facilitate mating and alignment of the decorative objects 106 with the spokes 104, the decoration system of this invention is designed such that a user could also use other means for coupling the decoration objects 106 to the spokes 104. These means may include tape, glue, clamps, or any other conventional means known in the art.

Since the spokes 104 may be removed from the receiving holes 302 after insertion, a user may change any individual decorative object 106, or even the entire theme, whenever the user desires. Furthermore, since the snaps 800 may be removed from the spokes 104, the spokes 104 may be reused with a new snap 800 and decorative object 106.

The decorative objects 106 may take on a variety of forms. In the embodiment shown in FIG. 1*a*, they are two-dimensional panels intended to serve as frames for photographs, illustrations, or other images, though, for brevity, only photographs will be described. In addition to inserting photographs, a user may decorate the front of a frame with paint, stickers, or any embellishment. The photographs could be a user's own photographs, cut to fit inside the panels, or they may be photographs sold as part of a theme or decoration kit. Furthermore, a user could obtain the photographs from a third party and then cut them to fit inside the panels. A template (not shown) may be included in order to help the user cut the photographs to the appropriate size.

Figure 19A:
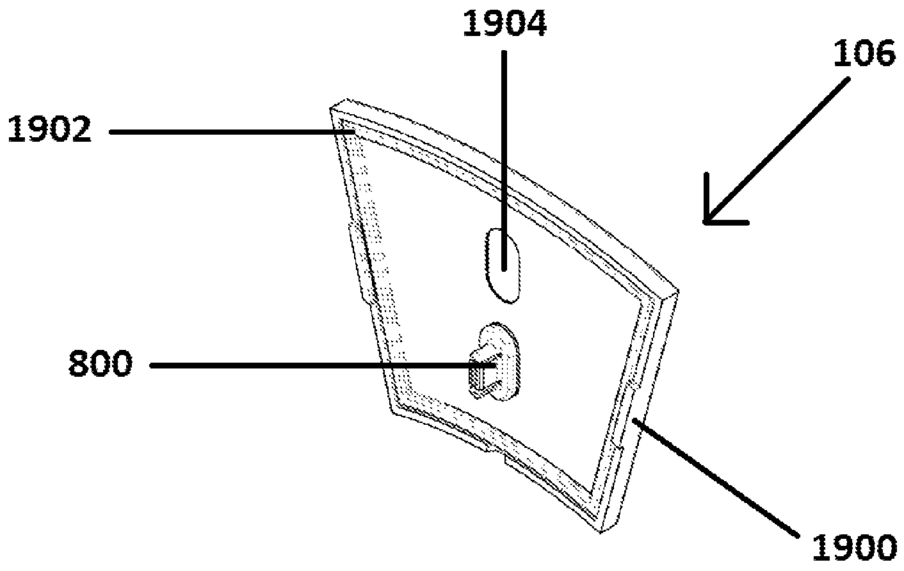
FIG. 19A is a perspective view of a picture frame and snap elements of the decoration system of the present invention.
Figure 19B:
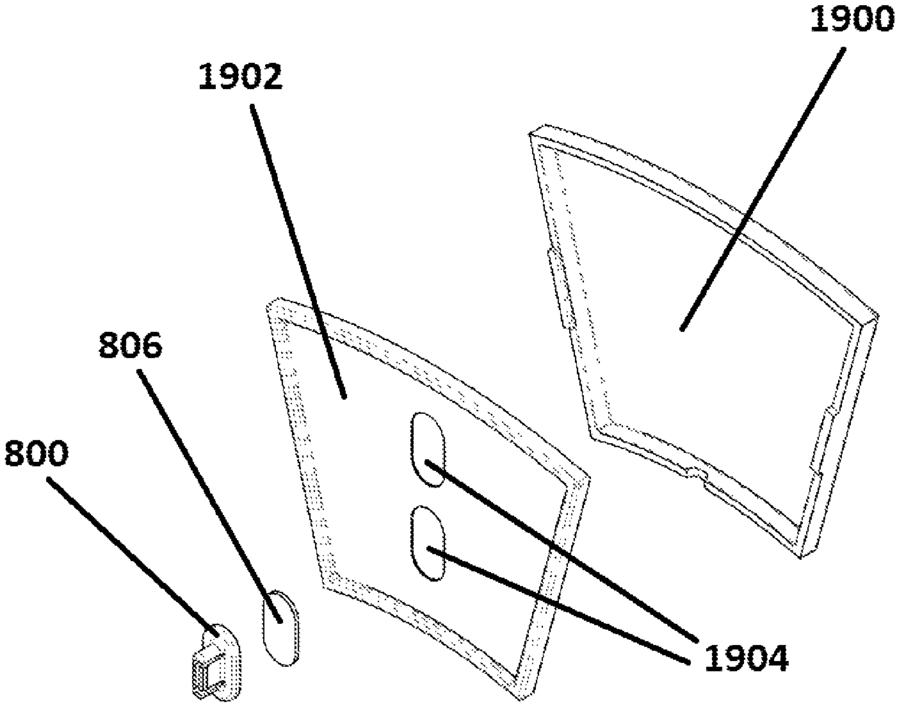
FIG. 19B is a perspective exploded view of the picture frame and snap elements.

FIGS. 19A-19B provide a more detailed view of a decorative object 106 in the form of a photograph frame. The frame comprises two parts, a cover portion 1900 and a back portion 1902, that can be snapped together to form the frame. The cover portion 1900 provides a clear surface to retain a photograph in the frame while the back portion 1902 provides a means of coupling the frame to a snap 800 and spoke 104. In this embodiment, the back portion 1902 has two snap-alignment guides 1904 in order to facilitate the alignment of the frame in relation to a snap 800 and spoke 104 (also shown in FIG. 4). Providing two or more snap-alignment guides 1904 allows a user to choose how far out the frame extends from the base object 100, or, alternately, allows a user to maintain the same distance using spokes 104 of different lengths. The back portion 1902 could also be formed without the snap-alignment guides 1904.

In one embodiment, the decorative objects 106 may be aligned to form a continuous panel around the periphery of the base object 100. Some non-limiting examples of this may include individual photos or illustrations, with or without frames, which are placed on spokes 104 and inserted into receiving holes 302 so that they appear to be joined side-by-side. FIG. 1*d* shows a full ring of such panels, in this case four quadrants which form a continuous background behind carousel horses, though any number and size of panels may be used. In another embodiment, a preformed continuous panel that is one single piece rather than a plurality of individual decorative objects 106, could be coupled to one or more spokes 104, which are inserted into the receiving holes 302 of the first receiving ring 300, the second receiving ring 304, or any other receiving ring present in such embodiment. Such a continuous panel might be of sufficient length to form a complete circle around the periphery of base object 100, or this panel might be shorter, such that it serves as one-eighth or one-fourth or some other portion of a circular banner, allowing the user to more conveniently place backgrounds or other displays larger than a single decorative object 106.

The inclusion of multiple receiving rings allows a user to determine the depth at which such display appears in relation to the base object 100 or any other decorative objects 106 employed.

Any number of different themes are also possible. For example, the decorative objects 106 could represent a zookeeper and a variety of animals, wherein the rotation of the decorative objects 106 around the base object 100 simulates the zookeeper attempting to capture the escaped animals. Other themes could include decorative objects 106 in the form of fish swimming around a base object 100, or vehicles traveling around a base object 100. These themes may also utilize the rim 102 and second receiving ring 304. In the first example, the zookeeper and animals may rotate with the first receiving ring 300 while trees, buildings, or other scenery remain stationary on the second receiving ring 304. In the second example, the rim 102 could extend further outward from the base object 100 and include portholes that the fish on the first receiving ring 300 could pass behind.

Additional themes could also of course be directed to sports teams, colleges, television shows, movies, holidays, seasons, and other hobbies or interests.

Although a number of means have been described above by which a user may further modify the rim 102, spokes 104 or decorative objects 106, some additional non-limiting examples include: paint, markers, colored paper, fabric, felt, pictures, glitter, stickers, glue, ribbon, magnets, beads, sequins, or jewelry, as well as two- and three-dimensional representations of people, animals, and other objects. The rim 102, spokes 104 and decorative objects 106 may be configured to receive all or just some of these items.

Rather than placing the base object 100 on a vertical surface, such as a wall, the base object 100 may also be placed on a horizontal surface, such as a table. This embodiment, shown in FIGS. 1*e* and 20, involves the addition of horizontal couplers 2000, which are shown in greater detail in FIG. 21.

In order to switch from the vertical embodiment to the horizontal embodiment, a user would remove any decorative objects 106 currently coupled to the spokes 104. The user would then couple horizontal couplers 2000 to each spoke 104. This may be accomplished by placing the lower coupler portion 2100 into the snap receiving hole 810 of each spoke 104. Next, the user couples additional spokes 104 to each horizontal coupler 2000 by placing the lower spoke portions 808 into the upper coupler portions 2102. As a result, there are now spokes 104 oriented perpendicular to the horizontal surface and ready to receive decorative objects 106.

In addition to facilitating the coupling of the spokes 104, the horizontal couplers 2000 could also provide a rotation feature for any individual decorative object 106. For example, the upper coupler portion 2102 could rotate relative to the lower coupler portion 2100. This would allow decorative objects 106 coupled to the spokes 104 to rotate, independently of or in concert with the rotation of the first receiving ring 300 relative to the base object 100. More specifically, the decorative objects 106 could be rotated manually by the user such as to display their decorative object 106 with a different perspective, or means could be provided to rotate the individual decorative objects 106 automatically in relation to the horizontal couplers 2000, via engagement with some other portion(s) of the decoration system, or via motorization or any other known means.

Figure 1B:
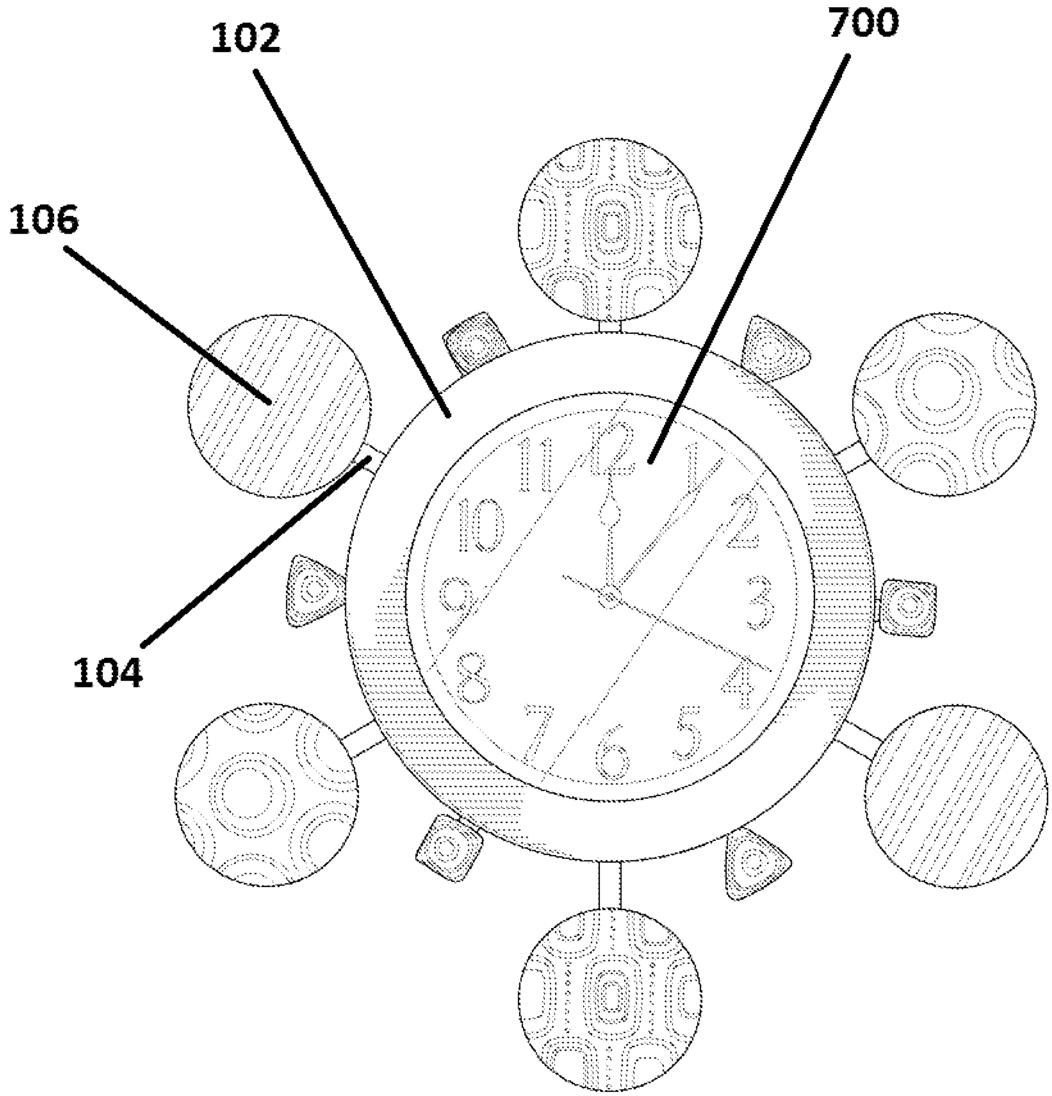
FIG. 1*b* is a front view of the decoration system of the present invention, showing one possible type of decorative object as applied to a wall clock.
Figure 1C:
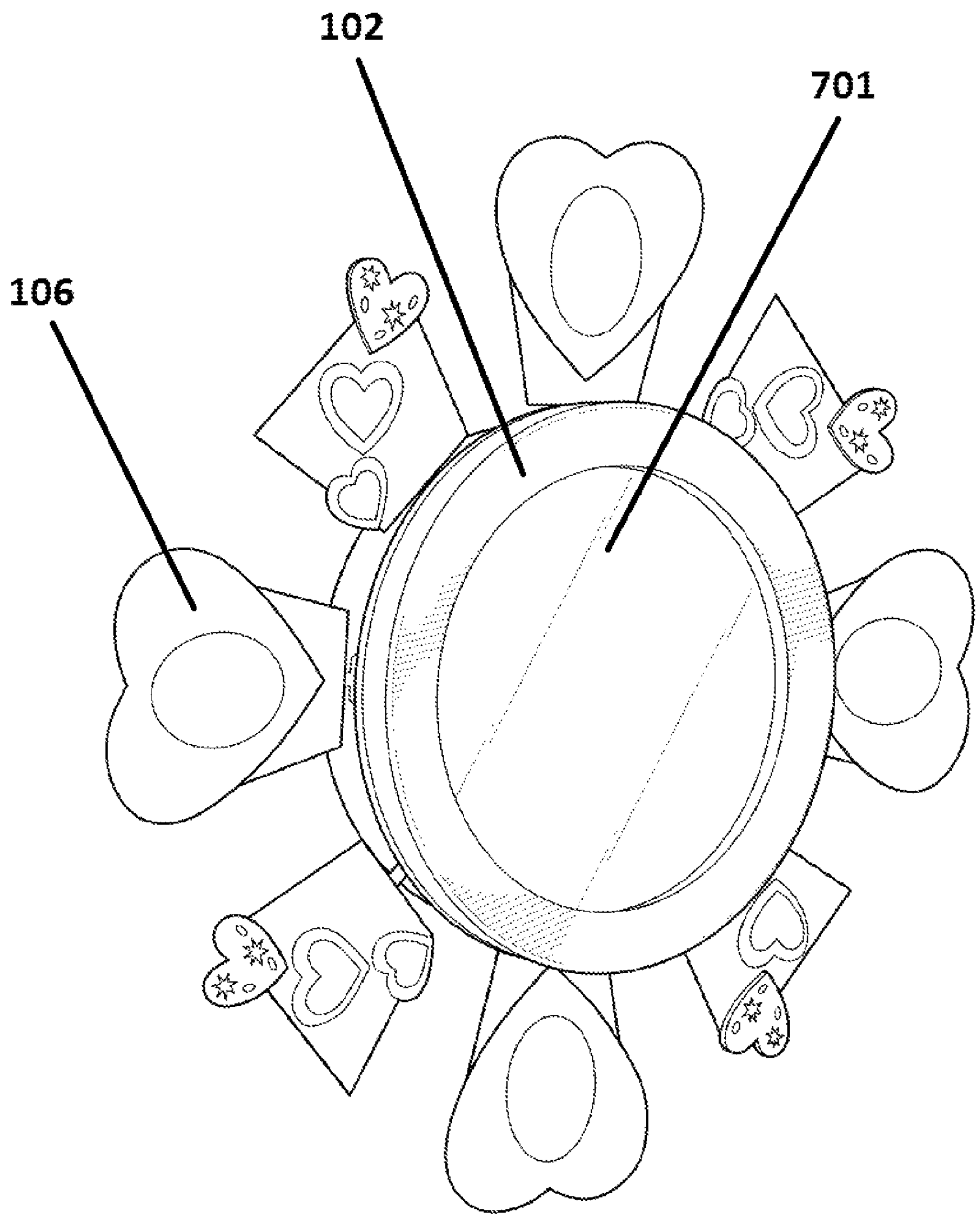
FIG. 1*c* is a perspective view of the decoration system of the present invention, showing one possible type of decorative object as applied to a mirror.
Figure 1D:
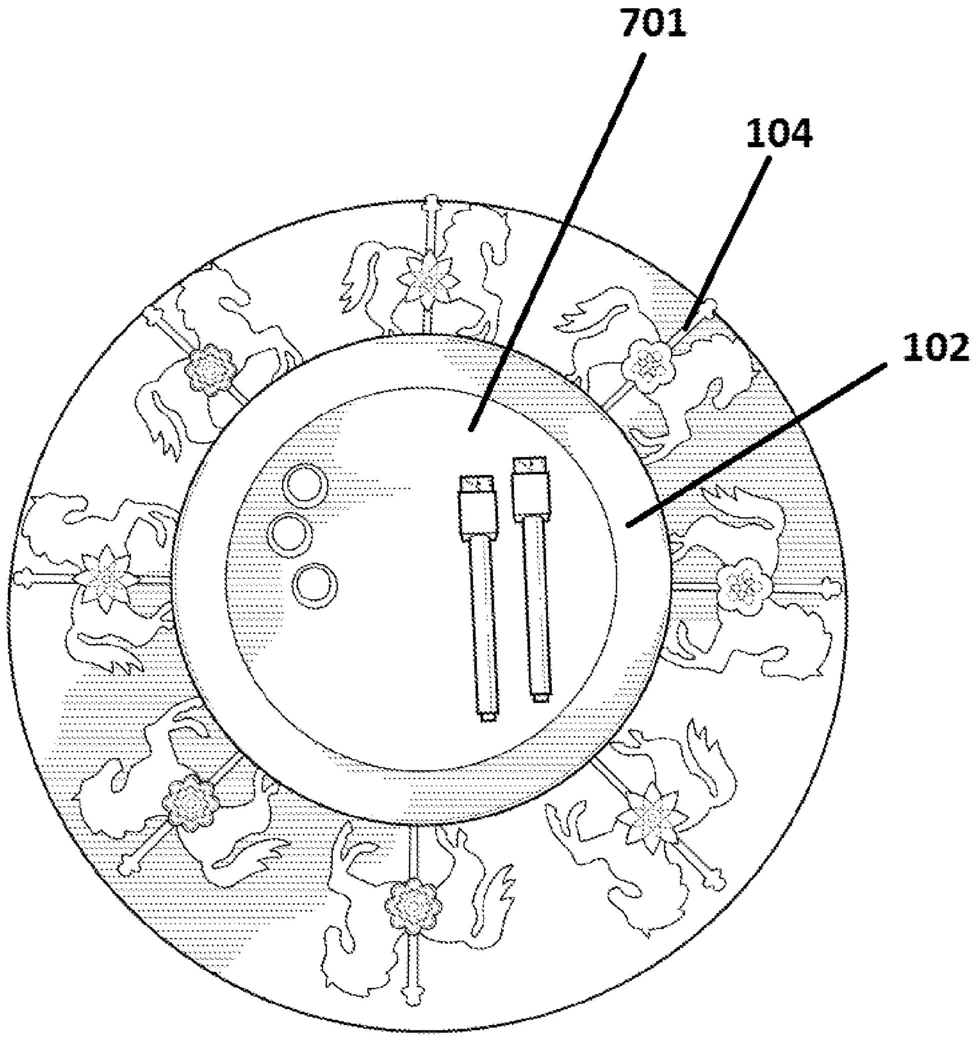
FIG. 1*d* is a front view of the decoration system of the present invention, showing one possible type of decorative object as applied to a message board.
Figure 1E:
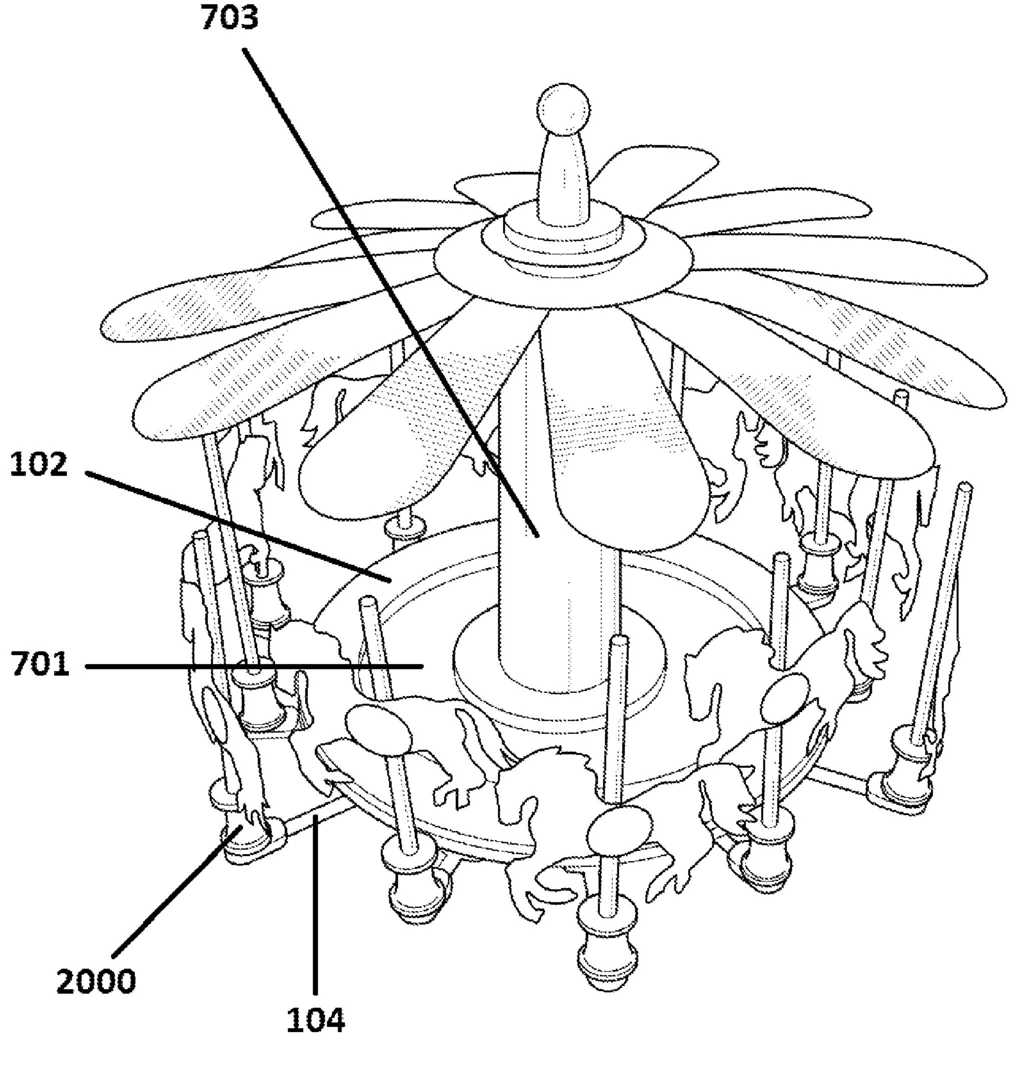
FIG. 1*e* is a perspective view of the decoration system of the present invention, showing one possible type of decorative object as applied to the base object oriented in a horizontal position.
Figure 20:
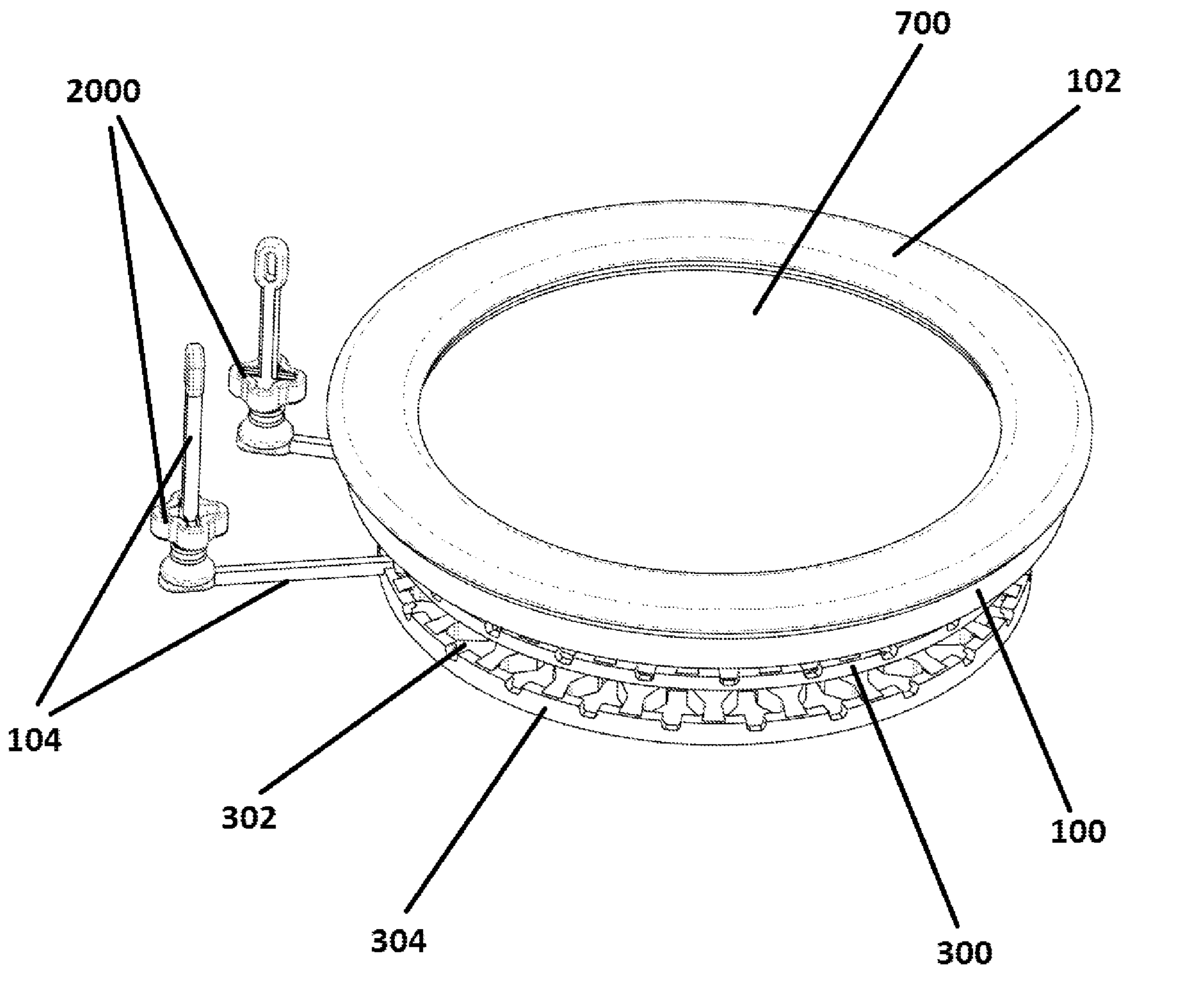
FIG. 20 is a perspective view of a tabletop embodiment of the decoration system of the present invention without decorative objects.

In the embodiment shown in FIGS. 1*d*, 1*e*, and 20, the base object 100 is a message board. The message board provides a means of coupling a centerpiece 703 to the base object 100, one possible example of such coupling means being magnetization. Furthermore, the centerpiece may relate to the theme the user has chosen for the decorative objects 106 and rim 102. For example, when the decorative objects 106 rotating around the base object 100 are carousel horses, the centerpiece could be a festive tent; when the decorative objects 106 are sailboats, the centerpiece could be a lighthouse; and when the decorative objects 106 are reindeer, the centerpiece could be a Christmas tree.

Figure 21:
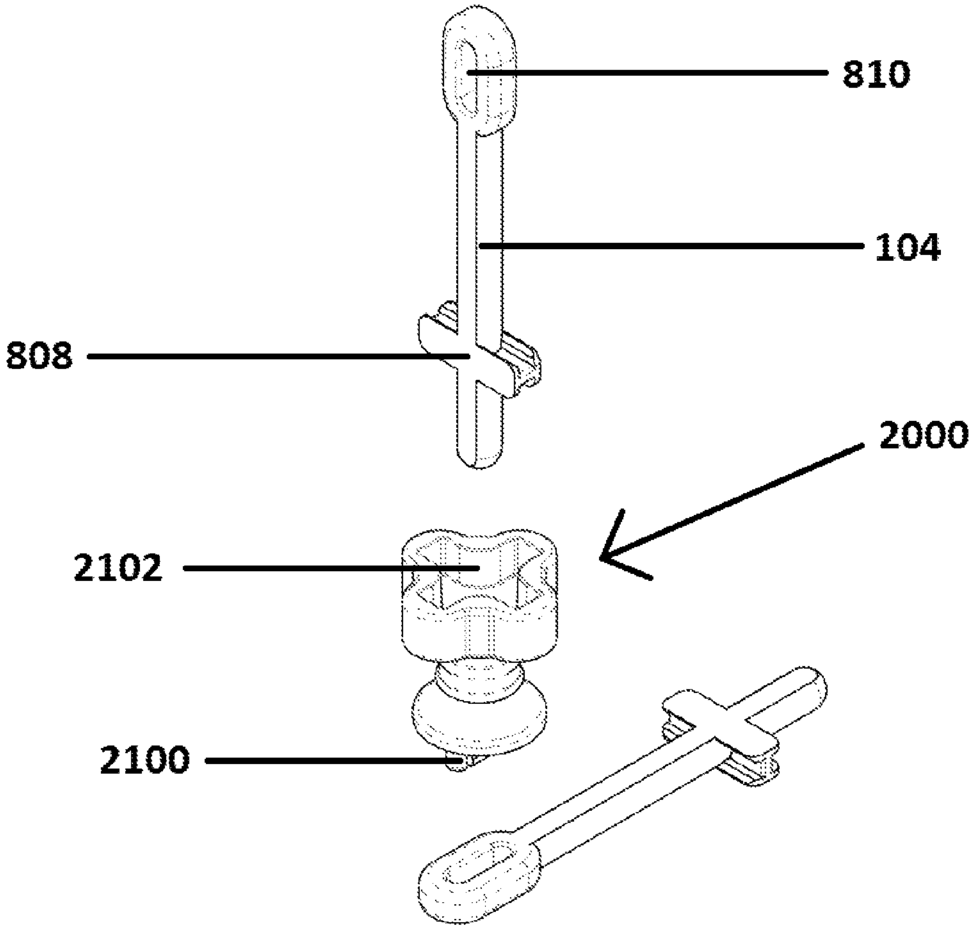
FIG. 21 is a perspective exploded view of spoke and horizontal coupler elements for use with the tabletop embodiment.
Figure 22A:
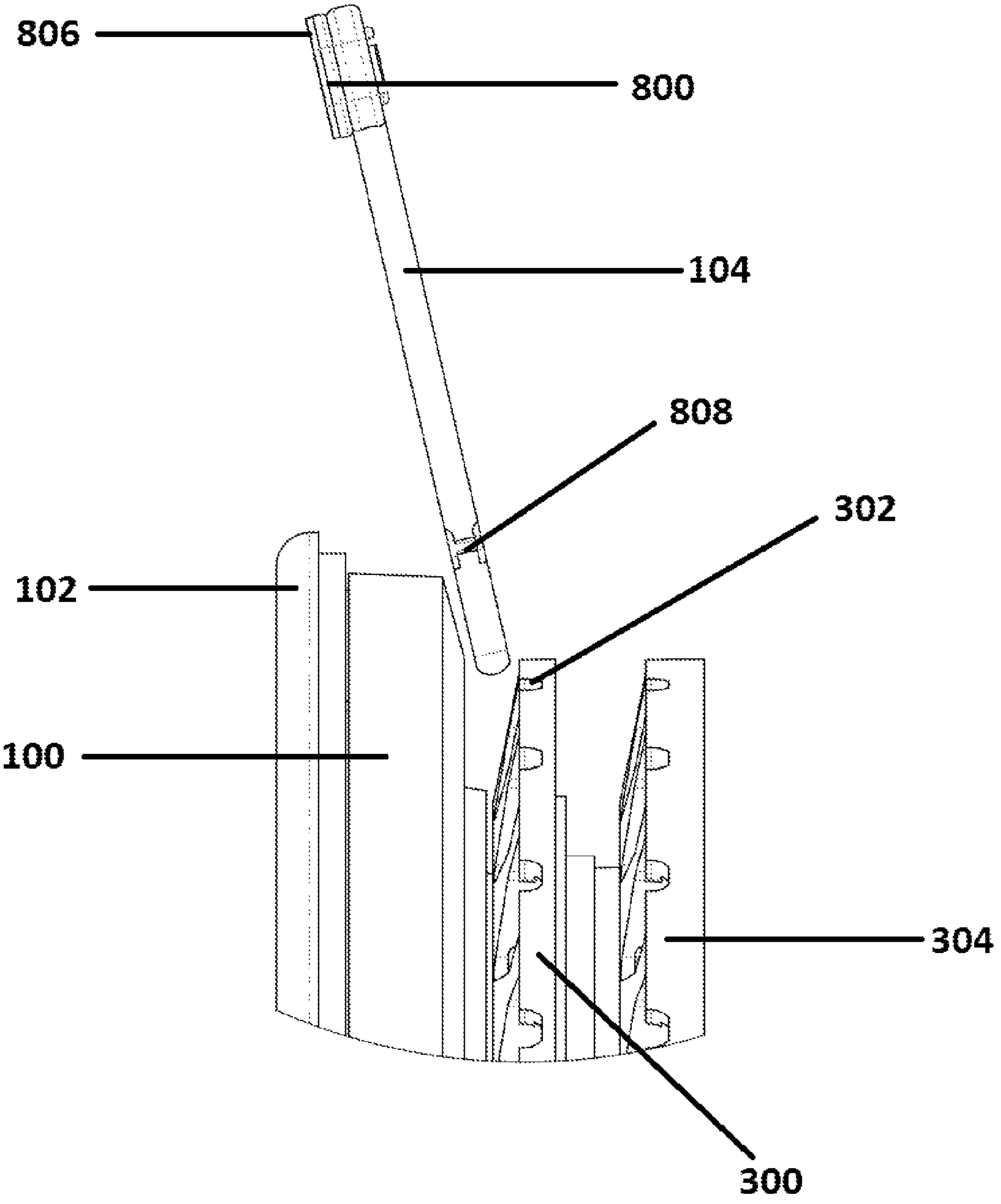
FIG. 22A is a side view of one method of attaching and removing spokes of the decoration system of the present invention.
Figure 22B:
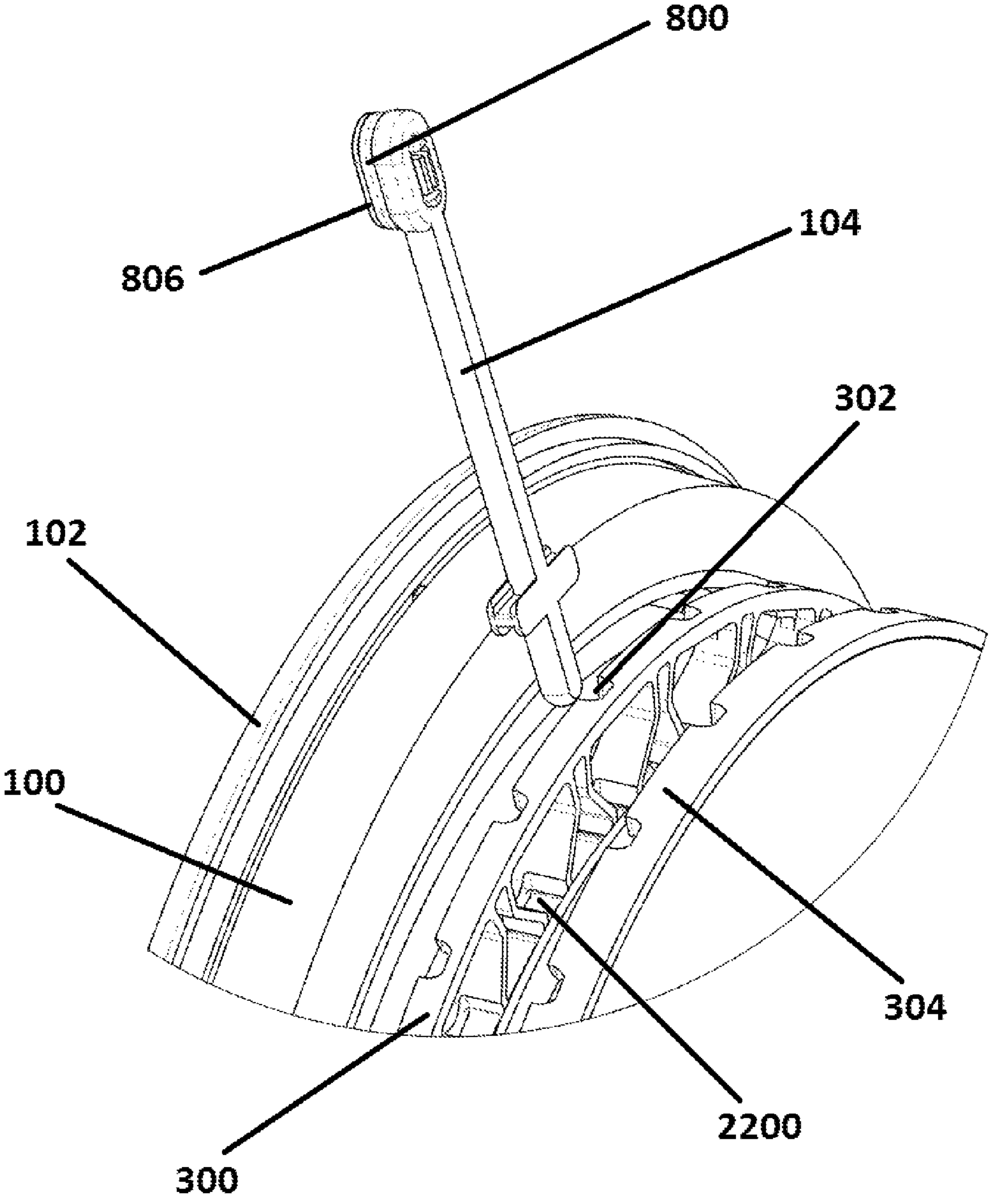
FIG. 22B is a perspective view of one method of attaching and removing spokes.
Figure 23A:
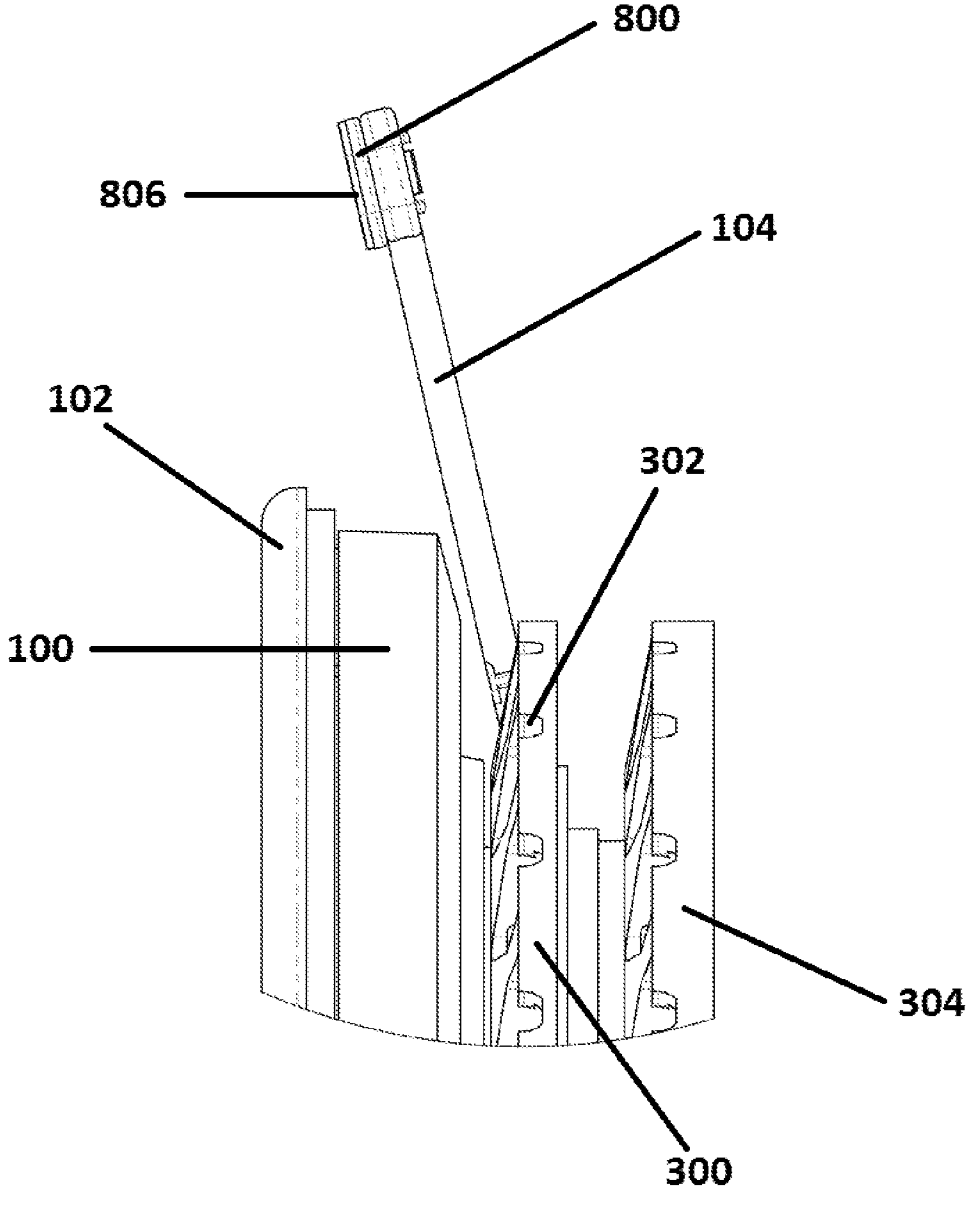
FIG. 23A is a side view of one of the steps of one method of attaching and removing spokes.
Figure 23B:
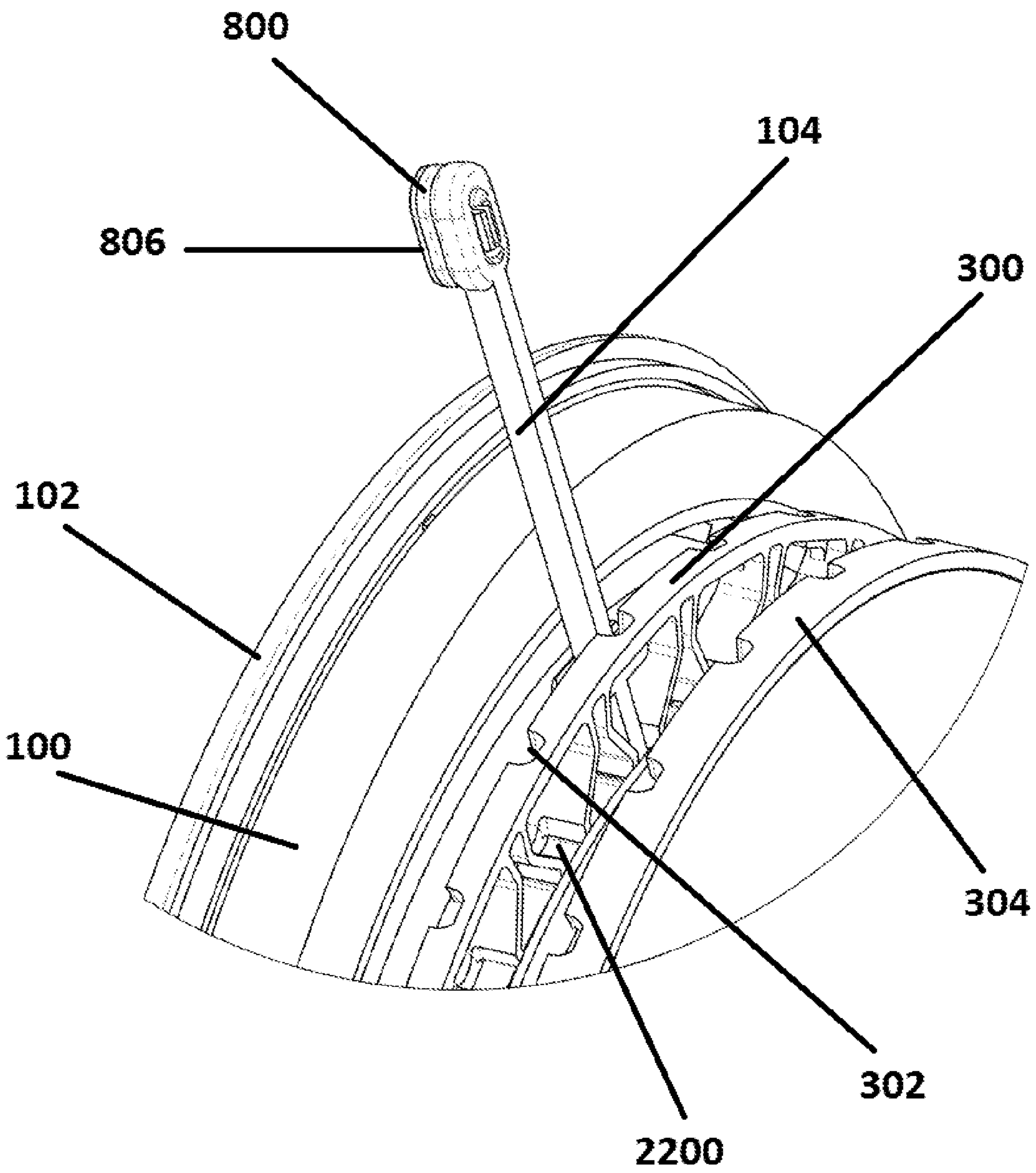
FIG. 23B is a perspective view of the same step of one method of attaching and removing spokes as shown in FIG. 23A.
Figure 24A:
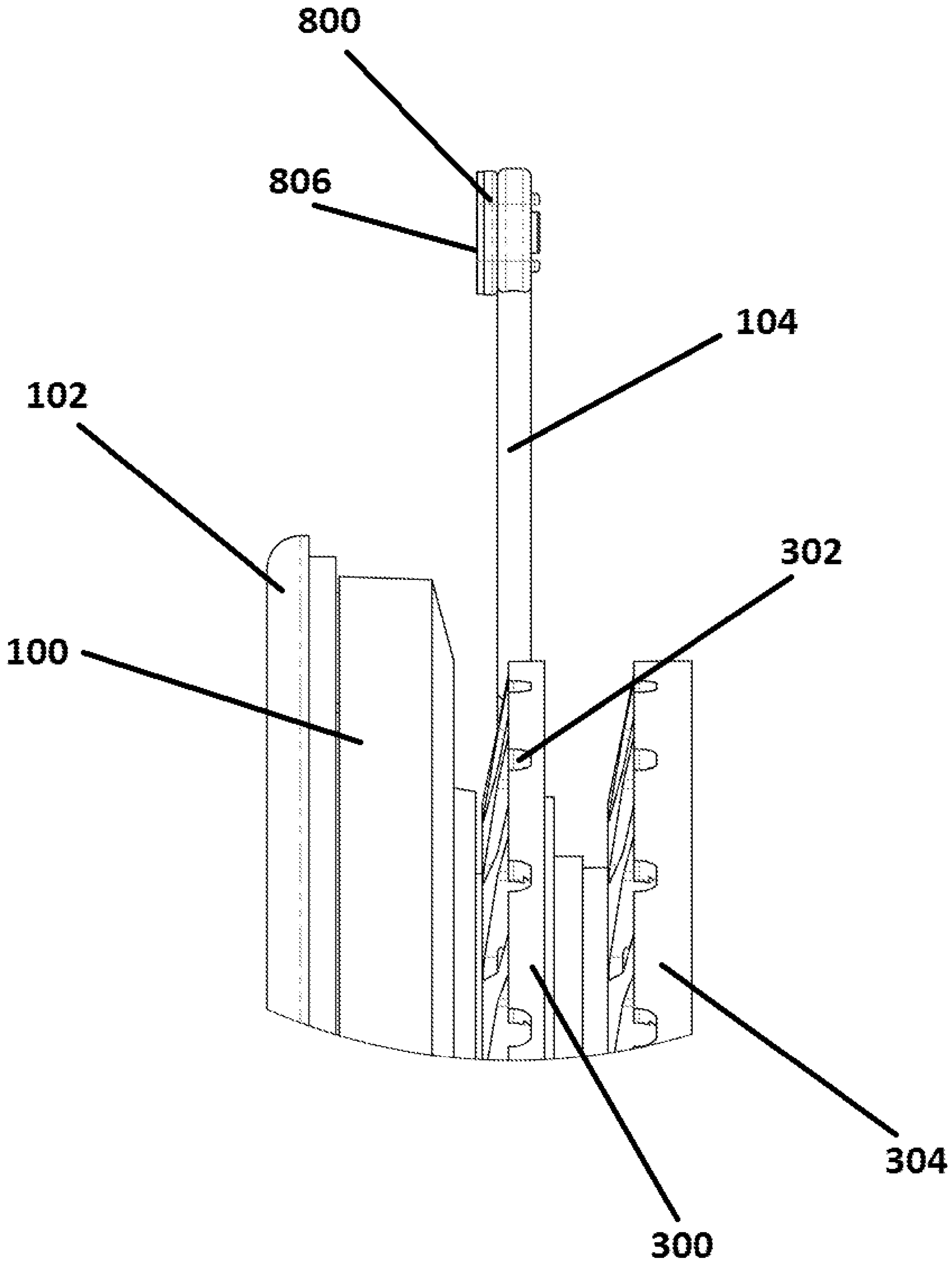
FIG. 24A is a side view of another step of one method of attaching and removing spokes.
Figure 24B:
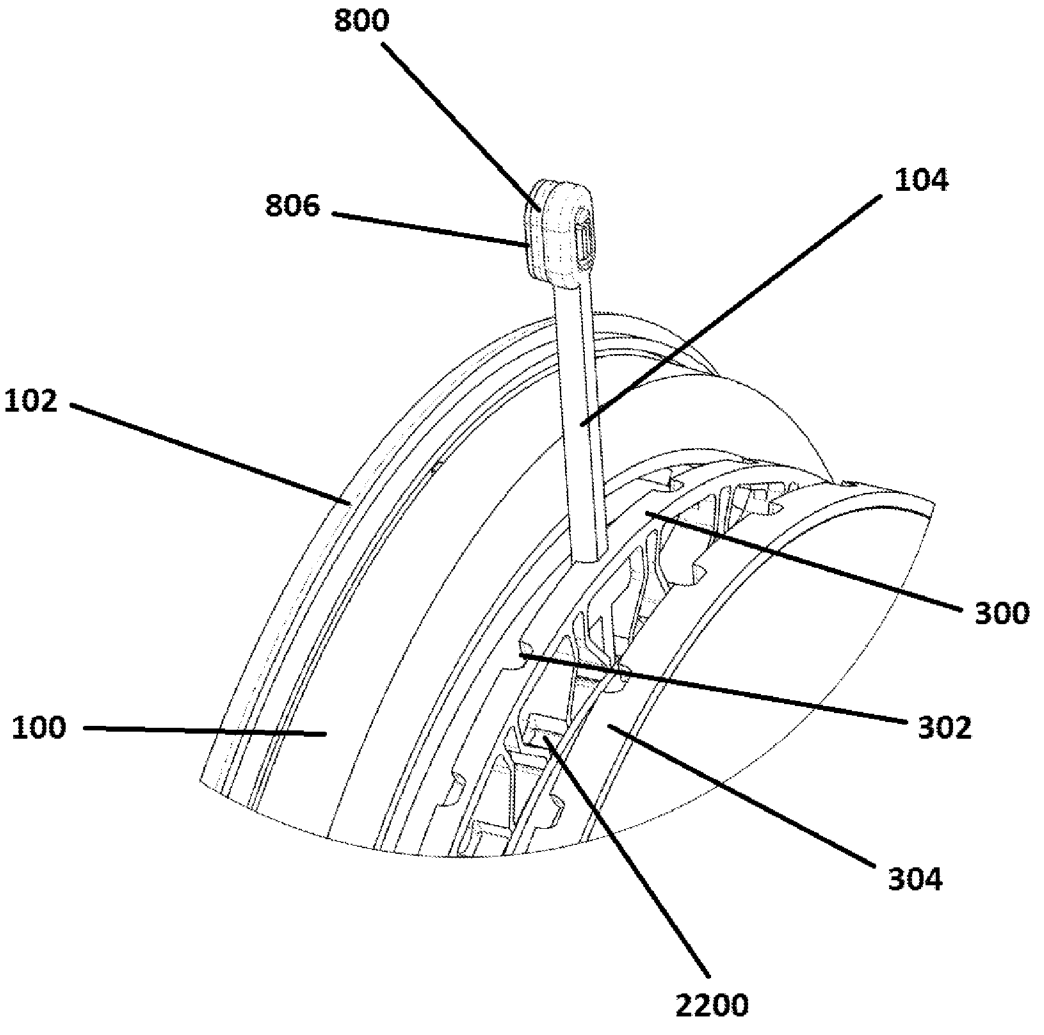
FIG. 24B is a perspective view of the same step of one method of attaching and removing spokes as shown in FIG. 24A.
Figure 25A:
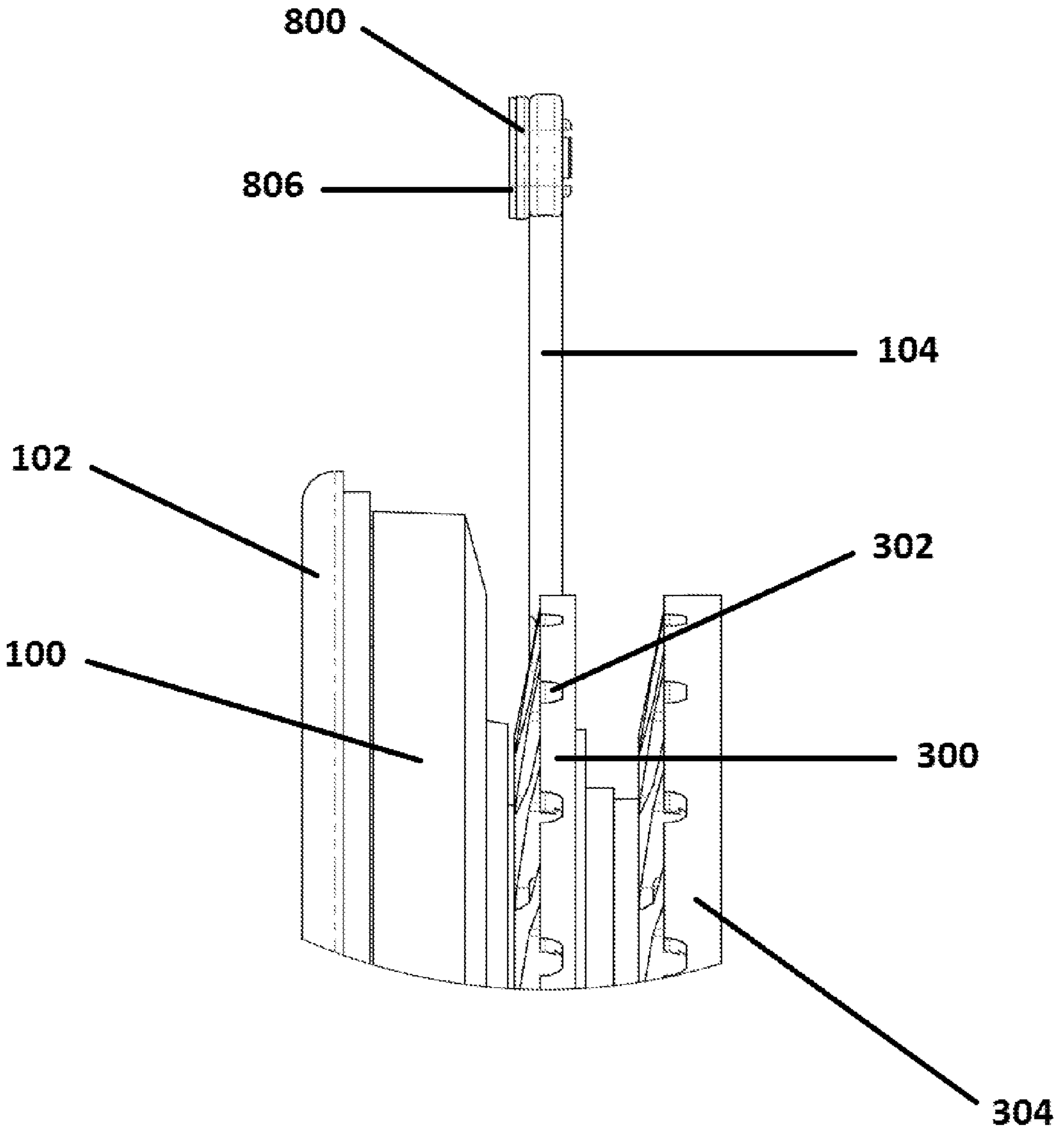
FIG. 25A is a side view of another step of one method of attaching and removing spokes.
Figure 25B:
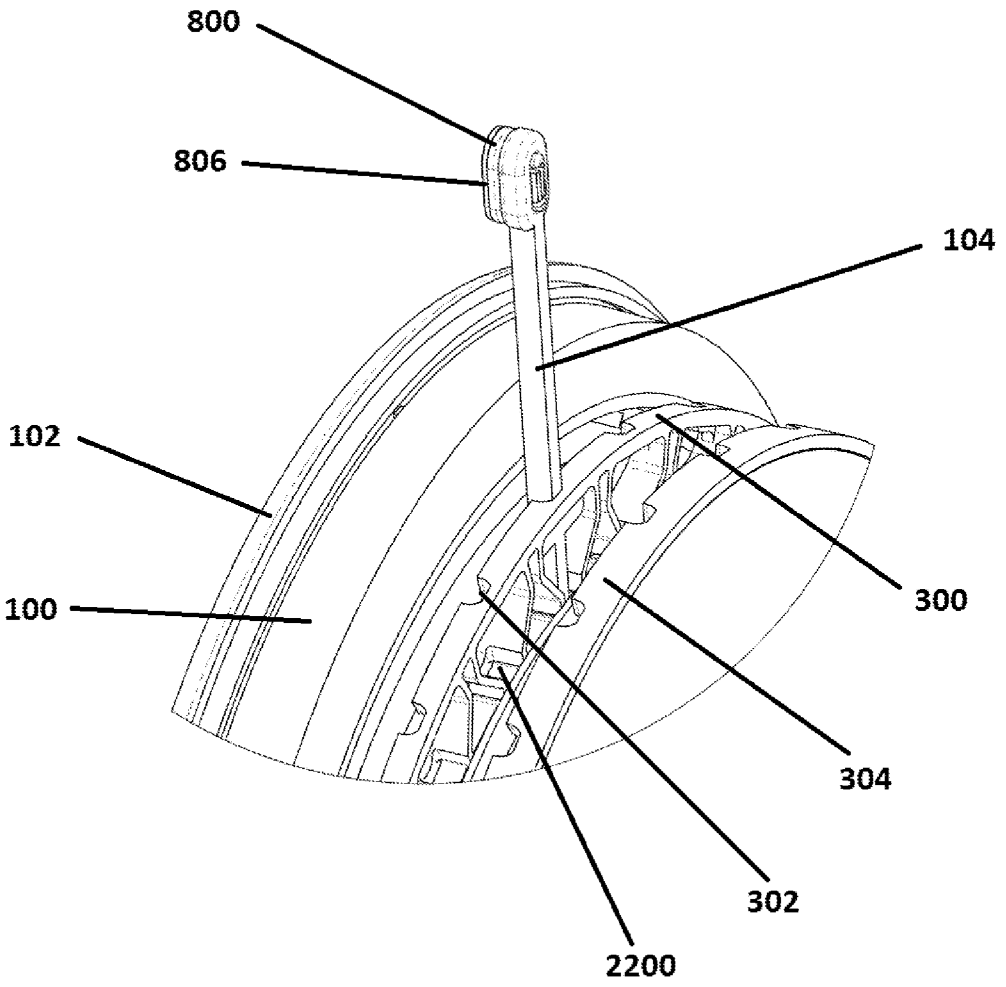
FIG. 25B is a perspective view of the same step of one method of attaching and removing spokes as shown in FIG. 25A.

In the vertical orientation, for example when the base object 100 is to be hung on the wall, the second receiving ring 304 may provide means to display a stationary background behind the decorative objects 106 coupled to the rotating first receiving ring 300. Alternately, when this same base object 100 is placed in the horizontal orientation as shown in FIGS. 1*e*, 20, and 21, for example when the base object 100 is to be laid flat on a tabletop, the second receiving ring 304 may provide a means for attaching an underlying base to appear beneath the decorative objects 106 coupled to the rotating first receiving ring 300.

For example, the decorative objects 106 on the second receiving ring 304 could be mirrors, representing ice, while above the ice, the decorative objects 106 on the first receiving ring 300 are ice skaters.

Embodiments of the present invention could also include light and sound producing means. In such embodiments, any component of the decoration system could be fashioned to include lights or sounds, and the sounds could include music, voice recordings, animal noises, or any other suitable sound. Furthermore, the lights and sounds could be activated by pressing a button, activating a switch, inserting a spoke 104, rotation of one or more receiving rings, or by any other appropriate means. Also, similar to the rotation of the receiving rings, the lights and sounds could be produced continuously or for a selectively determined duration. The switch may control the intensity, volume, duration, and other characteristics of both the illumination and sound producing means.

Additionally, a secondary base object (not shown) may be provided in order to help a user store and display extra spokes 104, and their attached decorative objects 106, when not in use with the base object 100. The secondary base object has receiving holes 302 in order to receive the spokes 104, and could take the form of a three-dimensional sculpture such as a porcupine, a simple geometric shape, or even a strip that could be hung from a bed frame or in a school locker.

As mentioned previously, the base object 100 may also have a functional display element that may be reversible as shown in FIGS. 1*a*, 1*b*, 1*c*, 1*d*, 1*e*, 7, and 8. The clock cover lens 700 may be removed and replaced by a similarly-sized insert 701 shown in FIGS. 1*c* and 1*d* which, by way of example, may have a mirrored surface on one side and a magnetic message board surface on the other side, such that the insert is easily reversible by the user to suit their own display preference at any given time. To install the clock cover lens 700, the user would remove the rim 102, remove the reversible mirror/message board insert 701 if it is present, place the clock cover lens 700 in the same location (over the face of the base object 100), and then reattach the rim 102. Similarly, to install the reversible mirror/message board 701, the user would remove the rim 102, remove the clock cover lens 700, insert in its place the reversible mirror/message board 701 displaying whichever surface the user prefers, and then reattach the rim 102. As a result, using a single base object 100, in this case a user may convert between current display of a clock as shown in FIG. 1*b*, a mirror as shown in FIG. 1*c*, and a magnetic message board as shown in FIG. 1*d*.

In one embodiment, the spokes 104 could include hinges (not shown) or the spokes 104 could be flexible. For example, when the decoration system is in a horizontal configuration, the spokes 104 could pivot vertically upwardly and downwardly when either the spoke 104 or decorative object 106 comes in contact with a biasing object placed beneath it. For example, during rotation of the first receiving ring 300, as the spoke 104 comes in contact with a fixed underlying surface with undulating shape which has been attached to the lower second receiving ring 304, the spoke 104 may pivot or bend thereby to vertically pass over and back down the underlying rippled surface. Therefore, by way of example, if the decorative object in the first receiving ring was in the shape of a snow skier, when the skier comes in contact with the underlying surface in the second receiving ring, the skier will pass up, over, and down this underlying surface as the receiving ring 300 rotates, to simulate a skier going up and down ski slopes.

Although the invention has been described and illustrated with a certain degree of particularity, it is understood that those skilled in the art will recognize a variety of additional applications and appropriate modifications within the spirit of the invention and the scope of the claims.

What is claimed is:

1. An interchangeable decoration system comprising:

a. a base object;

b. one or more receiving rings having a front side, a back side, an inner side, and an outer side, the outer side having a plurality of receiving holes, said receiving rings being releasably attached to and separate from said base object;

c. one or more spokes having a first end and a second end, said first end releasably coupled in a perpendicular relation to said outer side of said one or more receiving rings; and d. one or more decorative objects which can be releasably coupled to said spokes.

2. An interchangeable decoration system as recited in claim 1, further comprising:

e. one or more functional display elements; and f. a releasably attached rim which frames the base object.

3. An interchangeable decoration system as recited in claim 2, wherein said functional display element has a first side selected from the group consisting of mirror, message board, and decorative presentation surface, and a second side selected from the group consisting of a mirror, message board, and decorative presentation surface.

4. An interchangeable decoration system as recited in claim 3, wherein said functional display element is reversible between said first side and said second side.

5. An interchangeable decoration system as recited in claim 1, further comprising:

e. means to rotate one or more of said receiving rings relative to said base object, said rotation of each ring capable of occurring independently of each other.

6. An interchangeable decoration system as recited in claim 5, further comprising:

f. one or more switches to selectively control the rotation of said one or more receiving rings.

7. An interchangeable decoration system as recited in claim 1, further comprising:

e. means to produce illumination; and f. means to produce sound.

8. An interchangeable decoration system as recited in claim 7, further comprising:

e. one or more switches to selectively control said illumination and said sound.

9. An interchangeable decoration system as recited in claim 1, wherein said base object is pivotable between a vertical and a horizontal orientation.

10. An interchangeable decoration system as recited in claim 9, further comprising:

e. a coupling which can be releaseably attached to said spoke, said coupling allowing a decorative item to be displayed in a plane different than said spoke.

11. An interchangeable decoration system as recited in claim 1, wherein said spoke is hinged.

12. An interchangeable decoration system as recited in claim 1, wherein said spoke is bendably flexible.

13. An interchangeable decoration system comprising:

a. a base object having a front side and a back side;

b. one or more receiving rings having a front side, a back side, an inner side, and an outer side, said outer side having a plurality of receiving openings, said receiving rings being releasably attached to and separate from said base object;

c. means to rotate said one or more receiving rings relative to said base object, said rotation of each ring capable of occurring independently;

d. one or more spokes having a first end and a second end, said first end releasably coupled in a perpendicular relation to said outer side of said one or more receiving rings;

e. one or more decorative objects which can be releasably coupled to said second end of said one or more spokes in a plane parallel to said one or more spokes; and f. a functional display element having a first side and a second side, said functional display element separate from and releasably coupled to said front side of said base object.

14. An interchangeable decoration system as recited in claim 13, further comprising:

g. a rim that is separate from and releasably attached to said front side of said base object.

15. An interchangeable decoration system as recited in claim 13, wherein said base object is pivotable between a vertical and a horizontal orientation and the system maintains all functionality in both orientations.

16. An interchangeable decoration system as recited in claim 13, wherein said one or more spokes contains a hinge between said spoke first end and said spoke second end thereby to allow said spoke second end to pivot relative to said spoke first end if an object is encountered during rotation of said one or more receiving rings or to orient said one or more decoration objects in a plane different than said one or more spoke first ends.

17. An interchangeable decoration system as recited in claim 13, wherein said one or more spokes is bendably flexible thereby to allow said spoke second end to pivot relative to said spoke first end if an object is encountered during rotation of said one or more receiving rings or to orient said one or more decoration objects in a plane different than said one or more spoke first ends.

18. An interchangeable decoration system as recited in claim 13, wherein said functional display element first side is selected from the group consisting of mirror, message board, and decorative presentation surface, and said functional display element second side is selected from the group consisting of mirror, message board, and decorative presentation surface.

19. An interchangeable decoration system as recited in claim 17, wherein said functional display element is reversible between said first side and said second side.

20. An interchangeable decoration system as recited in claim 13, further comprising:

g. a coupling which can be releasably attached between said one or more spokes thereby to allow a first spoke and a second spoke to be positioned at a different angular plane relative to each other.

21. An interchangeable decoration system as recited in claim 13, wherein said means to rotate said one or more receiving rings can be actuated during functional operation of the system.

* * * * *